United States Patent [19]

Shibazaki et al.

[11] Patent Number: 4,543,643

[45] Date of Patent: Sep. 24, 1985

[54] COPYING MAGNIFICATION SETTING DEVICE FOR AN ELECTROPHOTOGRAPHIC COPYING APPARATUS

[75] Inventors: Kenji Shibazaki, Aichi; Yutaka Irie, Toyokawa; Masazumi Ito, Toyokawa; Tomoji Murata, Toyokawa, all of Japan

[73] Assignee: Minolta Camera, Osaka, Japan

[21] Appl. No.: 498,885

[22] Filed: May 27, 1983

[30] Foreign Application Priority Data

| | | | |
|---|---|---|---|
| May 28, 1982 | [JP] | Japan | 57-91877 |
| Nov. 25, 1982 | [JP] | Japan | 57-206444 |
| Nov. 29, 1982 | [JP] | Japan | 57-209845 |
| Feb. 10, 1983 | [JP] | Japan | 58-20833 |
| Mar. 8, 1983 | [JP] | Japan | 58-38743 |

[51] Int. Cl.⁴ .................................................. G06F 1/00

[52] U.S. Cl. ........................................ 364/900; 355/55

[58] Field of Search ......................... 364/900 MS File; 355/55

[56] References Cited

U.S. PATENT DOCUMENTS

| | | | |
|---|---|---|---|
| 3,897,148 | 7/1975 | Ritchie et al. | 355/57 |
| 4,120,578 | 10/1978 | Daniels et al. | 355/8 |
| 4,287,461 | 10/1981 | Promis et al. | 318/571 |
| 4,330,196 | 5/1982 | Yamaguchi | 355/8 |
| 4,332,461 | 6/1982 | Cail et al. | 355/14 R |
| 4,441,805 | 4/1984 | Smith | 355/55 X |
| 4,459,010 | 7/1984 | Hinton et al. | 355/55 X |
| 4,498,759 | 2/1985 | Ogawa et al. | 355/55 X |

*Primary Examiner*—Raulfe B. Zache

*Attorney, Agent, or Firm*—Price, Gess & Ubell

[57] ABSTRACT

Disclosed herein is a device for setting a copying magnification in an electrophotographic copying apparatus. The device comprises means for manually inputting a numerical value, a memory means having a plurality of memory locations, selection key means for selecting one from the plurality of memory locations and control means for storing a numerical value input by the numerical value input means in said one of the memory locations selected by the selection key means, so that the copying apparatus operates to set a copying magnification by a numerical value stored in said one of the memory locations.

27 Claims, 37 Drawing Figures

COPYING MAGNIFICATION SETTING DEVICE FOR AN ELECTROPHOTOGRAPHIC COPYING APPARATUS

FIELD OF THE INVENTION

The present invention relates to a copying magnification setting device for use in an electrophotographic copying apparatus.

BACKGROUND OF THE INVENTION

In a conventional electrophotographic copying apparatus with variable magnification of enlarged or reduced size such as that disclosed in U.S. Pat. No. 3,897,148, copying magnification value can only be set in a stepwise fashion, whereby the copying operation cannot be carried out at a magnification value between, e.g., two different modification values which are set by the manufacturer of the copying apparatus. Moreover, magnification values set by the manufacturer cannot be adjusted by a user, so that if the size of an actual reproduction copy deviates from a desired size by, e.g., a mechanical error, such an error cannot be corrected.

There have been provided copying apparatuses in which the magnification value is substantially continuously adjustable such as those disclosed in U.S. Pat. Nos. 4,120,578, 4,287,461 and 4,332,461, though, in such conventional copying apparatuses, an optionally selected magnification value is effective during a single copying operation or one or more consecutive copying operations, and therefore in another subsequent copying operation, the position of a cursor for the magnification setting must again be adjusted by the operator. That is, the position of the cursor must be repeatedly adjusted even if a new copying operation is carried out in the same magnification value as the preceding copying operation, if the cursor is moved between the former and subsequent operations.

SUMMARY OF THE INVENTION

Accordingly, an essential object of the present invention is to provide a copying magnification setting device for an electrophotographic copying apparatus or the like in which a copying magnification value can be substantially continuously varied with simple operation, and the magnification value once established is selectively accessible whenever required.

Another object of the present invention is to provide a copying magnification setting device for an electrophotographic copying apparatus or the like in which an established copying magnification value can be easily adjusted when magnification of an actually obtained copy deviates from the established desired value.

In accomplishing these and other objects, according to one preferred embodiment of the present invention, there is provided a copying magnification setting device for an electrophotographic copying apparatus or the like which includes value inputting means for establishing a selected copying magnification value, memory means for storing the input value and control means for reading the stored value and establishing a magnification value of the copying apparatus in correspondence to the value read from storage.

BRIEF EXPLANATION OF THE DRAWINGS

These and other objects and features of the present invention will become apparent from the following description taken in conjunction with the preferred embodiments thereof with reference to the accompanying drawings, in which.

DESCRIPTION OF THE PREFERRED EMBODIMENTS

Copying Mechanism

Figure 1:
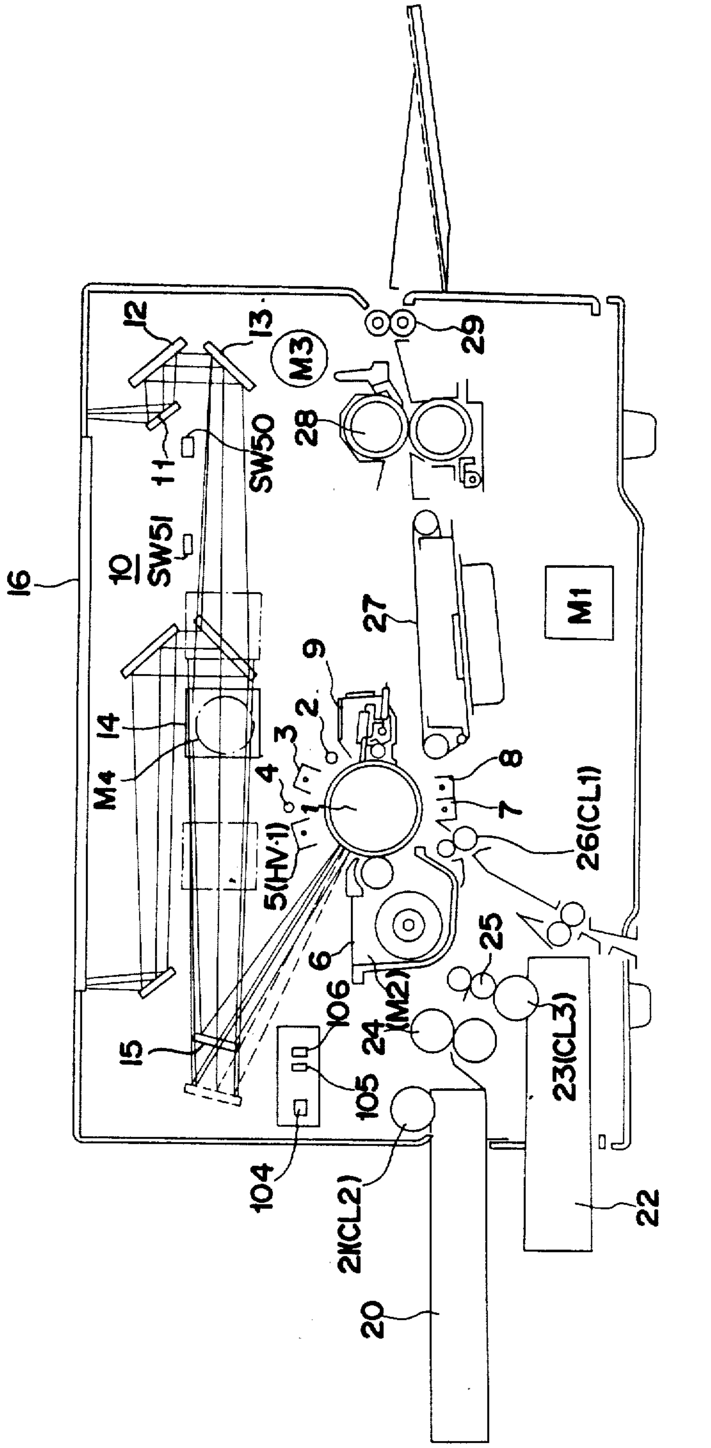
FIG. 1 is a schematic side sectional view of an electrophotographic copying apparatus to which the copying magnification setting device according to the present invention may be applied.

Referring to FIG. 1 of the drawings, there is shown an example of an electrophotographic copying apparatus to which a copying magnification setting device according to the present invention is applied. The electrophotographic copying apparatus comprises a photoreceptor drum 1 provided substantially at the central portion of the apparatus for rotation in the counterclockwise direction, and a main eraser lamp 2, a sub corona charger 3, a sub eraser lamp 4, a main corona charger 5, a developing device 6, a transfer charger 7, a copy paper separation charger 8 and a blade-type residual toner cleaning device 9 disposed around the photoreceptor drum 1. The photoreceptor drum 1 has a photosensitive layer formed on its cylindrical surface, which is photosensitized and charged by passing through the eraser lamps 2 and 4 and the corona chargers 3 and 5. The photoreceptor drum 1 receives an exposed image transferred from an original to be copied through an optical system 10.

The optical system 10 is provided under an original platform 16 for scanning an image of the original, which platform 10 is formed by transparent material such as glass. The optical system 10 comprises an illumination light source (not shown), movable mirrors 11, 12 and 13, a projection lens 14 and a projection mirror 15. A DC motor M3 drives the illumination light source and the movable mirrors 11, 12 and 13 so that the illumination light source and the movable mirror 11 are moved to the left in FIG. 1 at the same speed as the circumferential speed v of the photoreceptor drum 1 which is constant regardless of changes in copying magnification while the movable mirrors 12 and 13 are moved to the left in FIG. 1 at a speed of v/2n (n represents copying magnification). When the copying magnification is changed, the projection lens 14 is moved along the optical axis followed by rotational movement of the projection mirror 15, as hereinafter described with reference to a device for varying the copying magnification.

In the left-hand direction in FIG. 1 of the copying apparatus, there are provided copy paper cassettes 20 and 22 respectively having copy paper feeding rollers 21 and 23 while a path for the copy paper is formed by pairs of rollers 24 and 25, a pair of timing rollers 26, a transport belt 27, a fixing device 28 and a pair of discharge rollers 29.

Figure 3:
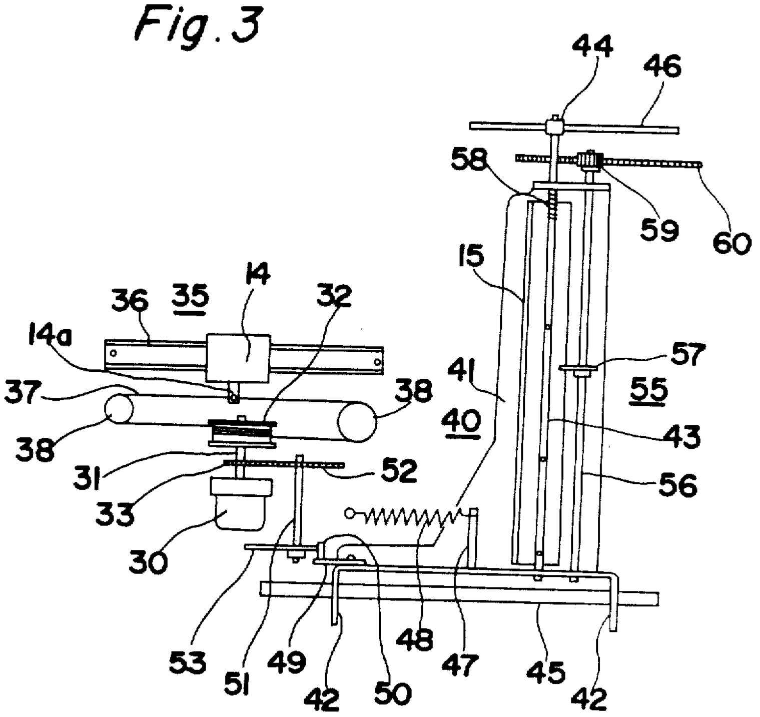
FIG. 3 is a perspective view showing a mirror moving mechanism provided in the copying apparatus of FIG. 1.
Figure 4:
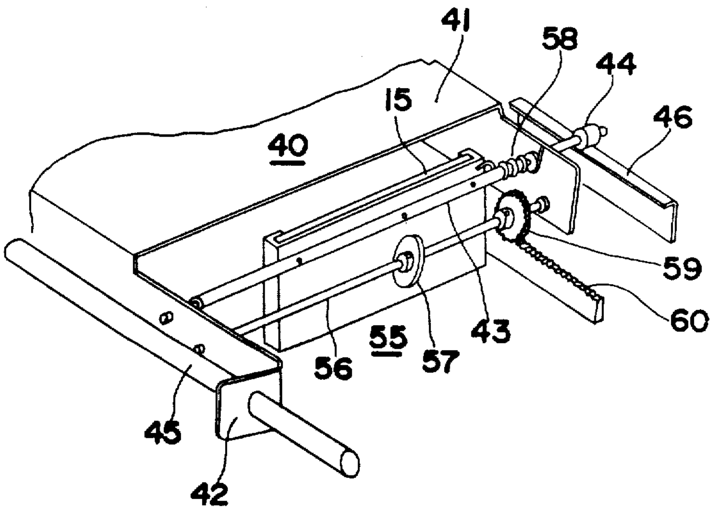
FIG. 4 is a perspective view of a mirror rotation mechanism provided in the copying apparatus of FIG. 1.

Referring now to FIGS. 3 and 4, there is shown a mechanism for moving the aforementioned lens 14 and mirrors 11, 12 and 15 for varying the copying magnification. The copying magnification varying mechanism is capable of selecting the copying magnification in a substantially stepless manner (i.e., with ratios selectable to, e.g., the third decimal place) from an enlarged size magnification to a reduced size magnification. More particularly, the mechanism may appropriately select the copying magnification within a range from an enlarged size magnification at a ratio of ×1.414 to a reduced size magnification at a ratio of ×0.647 about an equal size magnification at a ratio of ×1.

The copying magnification varying mechanism is generally formed by a lens moving mechanism 35, a mirror moving mechanism 40, a mirror rotation mechanism 55 and a stepping motor M4 for driving said mechanisms.

The lens moving mechanism 35 includes the projection lens 14 rotatably mounted on a guide rail 36 which is arranged in parallel with the optical axis of the projection lens 14, a driving pulley 32 fixed to an output shaft 31 of the stepping motor M4 and a driving wire 37 wound around the driving pulley 32 and extending along a pair of rotatable pulleys 38 with its intermediate portion secured to a connecting arm 14*a* projecting from the side portion of the projection lens 14. Thus, upon forward or reverse rotation of the stepping motor M4 at a predetermined rotational frequency, the driving wire 37 is rotated in a forward or reversed direction through the driving pulley 32 so that the projection lens 14 is moved along the guide rail 36 on the optical axis thereof in the leftward or rightward direction, in FIG. 3 to be stopped in a position corresponding to the selected copying magnification.

The mirror moving mechanism 40 includes a movable member 41, a shaft 43 rotatably supported on the movable member 41 for fixing the rear side of the mirror 15, a guide shaft 45 arranged in parallel with the optical axis of the projection lens 14 with side portions 42 of the movable member 41 slidably mounted to the guide shaft 45 and a roller 44 rotatably provided in one end of the shaft 43 and placed on an auxiliary guide rail 46. The mechanism 40 further includes a pin 50 provided on the movable member 41 through a bracket 49, a cam 53 for driving the movable member 41, the circumferential surface of which is in contact with the pin 50 and a coiled spring 48 having its one end fixed to another pin 47, for urging the movable member 41 toward the cam 53. A gear 33 is fixed to the output shaft 31 of the stepping motor M4 to be engaged with another gear 52 fixed to one end of a support shaft 51, and the cam 53 is fixed to the other end of the support shaft 51.

Figure 2:
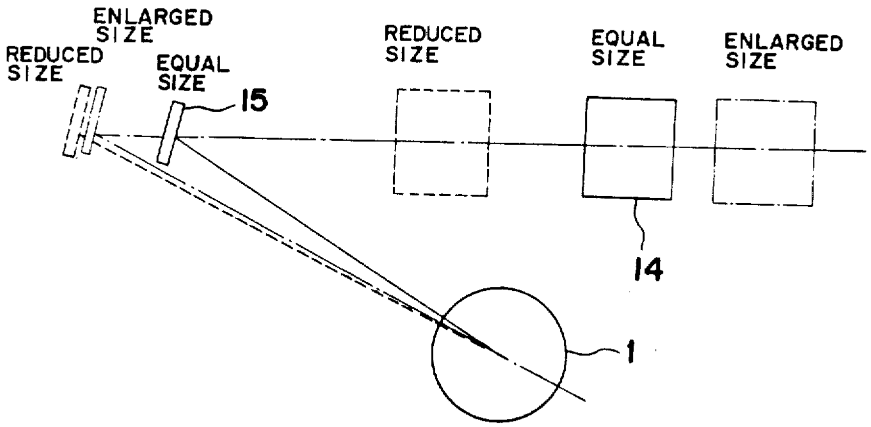
FIG. 2 is a schematic diagram illustrative of relation between positions of lenses shown in FIG. 1.

With the aforementioned arrangement, rotation of the stepping motor M4 is transmitted from the gear 33 to the cam 53 through the gear 52 and the support shaft 51, so that the movable member 41, containing the mirror 15 is moved frontwardly or rearwardly along the optical axis of the lens 14 in conformity to the circumferential shape of the cam 53, to effect a change of the optical path length caused by a change of the copying magnification. That is, the projection lens 14 and the projection mirror 15 are driven in association with each other by the stepping motor M4 following a change of the selected copying magnification, as shown in FIG. 2. The rotational frequency of the stepping motor M4 is continuously adjustable in the embodiment of the present invention for changing the copying magnification in a substantially stepless manner. However, in a case where the stepping motor M4 is controlled to change its rotational frequency in a stepwise manner, the copying magnification can also in like manner be changed.

The mirror rotation mechanism 55 includes a rotatable support shaft 56 provided in the movable member 41, a cam 57 fixed to the rotatable support shaft 56 with its circumferential surface being in contact with the rear surface of the projection mirror 15 for swingingly moving the same, a coiled spring 58 wound around the shaft 43 for urging the projection mirror 15 against the cam 57 and a pinion gear 59 fixed to the support shaft 56 to be engaged with a rack 60 which is mounted on the copying apparatus extending in parallel with the guide shaft 45. When the copying magnification value is changed, the optical axis of the luminous flux reflected by the mirror 15 deviates from the standard point on the photoreceptor drum 1. Thus, the mirror rotation mechanism 55 functions to correct deviation of an exposure point of the light reflected by the mirror 15 on the photoreceptor drum 1 by rotating the mirror 15 to direct the optical axis toward a standard exposure point on the photoreceptor drum 1 upon a change of the copying magnification. That is, when the movable member 41 is moved along guiderail 36 in compliance with a change of the copying magnification, the pinion gear 59 is rolled over the rack 60 so that the cam 57 is rotated along with the support shaft 56 and the mirror 15 is rotated about the shaft 43 in conformity to the peripheral shape of the cam 57 to correct the position of the exposure point.

In this case, the angle of rotation of the mirror 15 is so adjusted that the optical axis of the luminous flux reflected by the mirror 15 is directed to the center of the photoreceptor drum 1 in a maximum copying magnification (at the ratio of ×1.414 in this embodiment) while said optical axis is still directed to the position of the exposure point of the maximum copying magnification also in a smaller copying magnification. By virtue of this, the optical axis of the mirror 15 is directed perpendicularly to the photoreceptor drum 1 in a condition of the maximum copying magnification under which a slit-formed image is enlarged and projected on the photoreceptor drum 1 and thus an exposed image is most remarkably distorted, thereby reducing distortion of the exposed image caused by deviation of incident angles of the light.

Control Device

Figure 5:
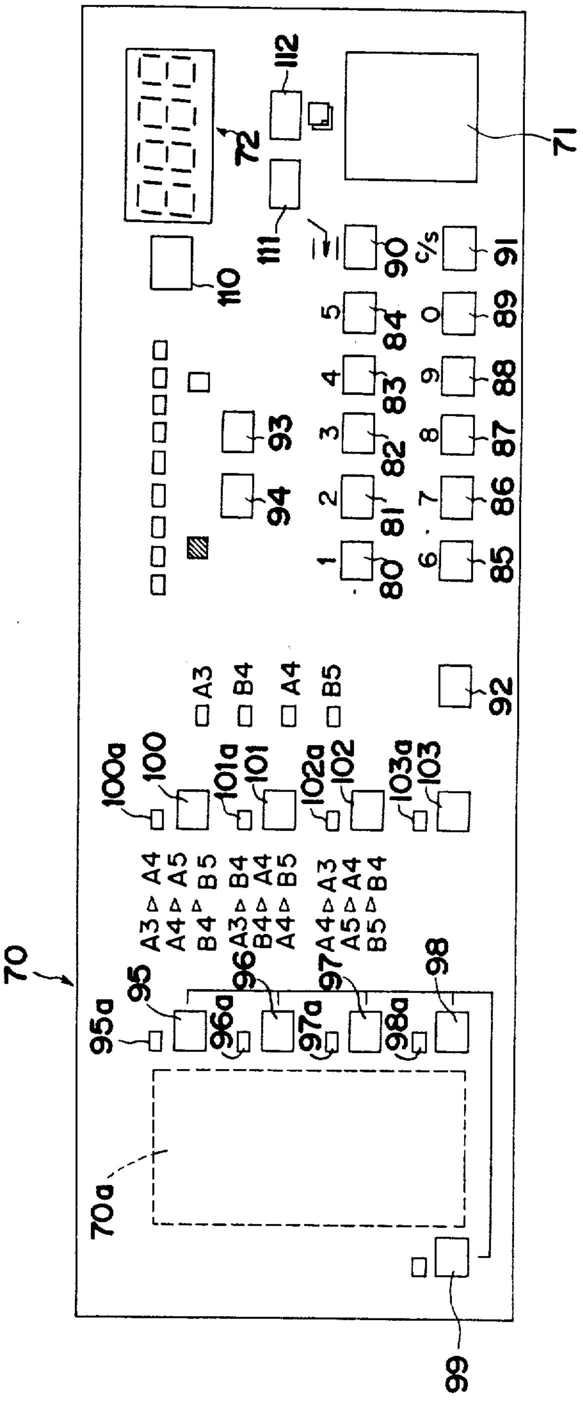
FIG. 5 is a top plan view of a control panel of the copying apparatus of FIG. 1.

In FIG. 5, there is shown a control panel 70 of the copying apparatus with the arrangement of a print key 71 for starting a copying operation, a numerical value display device 72 indicative of a number of four figures, ten keys 80 through 89 respectively corresponding to 1, 2, . . . 9, 0, an interruption key 90 for designating an interruption of the copying operation, a clear stop key 91, a copy paper selection key 92 for selectively designating the size of the copy paper provided in a plurality of stages, UP and DOWN keys 93 and 94 for selecting and changing, as hereinafter described, the magnification of the copy image and plurality of keys 95 to 103 forming the copying magnification setting selection device according to the present invention.

A first group of copying magnification setting selection keys 95 through 98 are arranged for selectively setting the copying magnification, and when one of the keys 95–98 is operated, in a condition that a first switching key 99 for switching a magnification setting mode is operated to switch the control mode of the copying apparatus to a first magnification setting mode, the numerical value input through the ten keys 80–89 and displayed on the display device 72 is stored as the copying magnification value in a memory location corresponding to the operated key.

With respect to a second group of magnification setting keys 100 through 103, a predetermined copying magnification is previously set in each of a plurality of respectively corresponding memory locations so that a copying operation can be carried out on the basis of a preset value, without the necessity of setting of such value, as in the case of the aforementioned first group of keys. Therefore, the preset copying magnification can be selected and set in, e.g., the manufacturing process with values generally used by the user as hereinafter described in detail.

Thus, the first group of keys function to selectively set the copying magnification as required by the user for particularly copying needs, while the second group of keys function to select preset copying magnifications in the typical ratios of, e.g., A4 size to B5 size, B4 size to A4 size, A3 size to A4 size or A4 size to A3 size in case of copying apparatuses to be used in, e.g., Japan. However, since the values preset with respect to the second group of keys are general or calculated copying magnifications, a mechanical error or an error in design might cause the magnification of an actually obtained copy to slightly deviate from the preset copying magnification. That is, even if an equal size magnification of ×1 is selected, the actually obtained copy might be, e.g., in an enlarged size magnification of ×1.004 or in a reduced size magnification of ×0.996. In such a case, a desired copying magnification can be obtained by operating a second switching key 104 (FIG. 1) to switch the control mode of the copying apparatus to a second copying magnification setting mode and setting a selected value in the memory locations corresponding to the keys 100 to 103, in a similar manner to the operation of the aforementioned first copying magnification setting mode. More particularly, a value of 1.002 or 0.998 may be set with respect to an equal size magnification key.

Reference numeral 110 indicates a magnification indicating key used for setting the copying magnification and numeral 111 indicates an UP key for scrollingly increasing the copying magnification by a fixed incremental unit value and numeral 112 indicates a DOWN key for similarly reducing the copying magnification by said incremental unit value.

Figure 6:
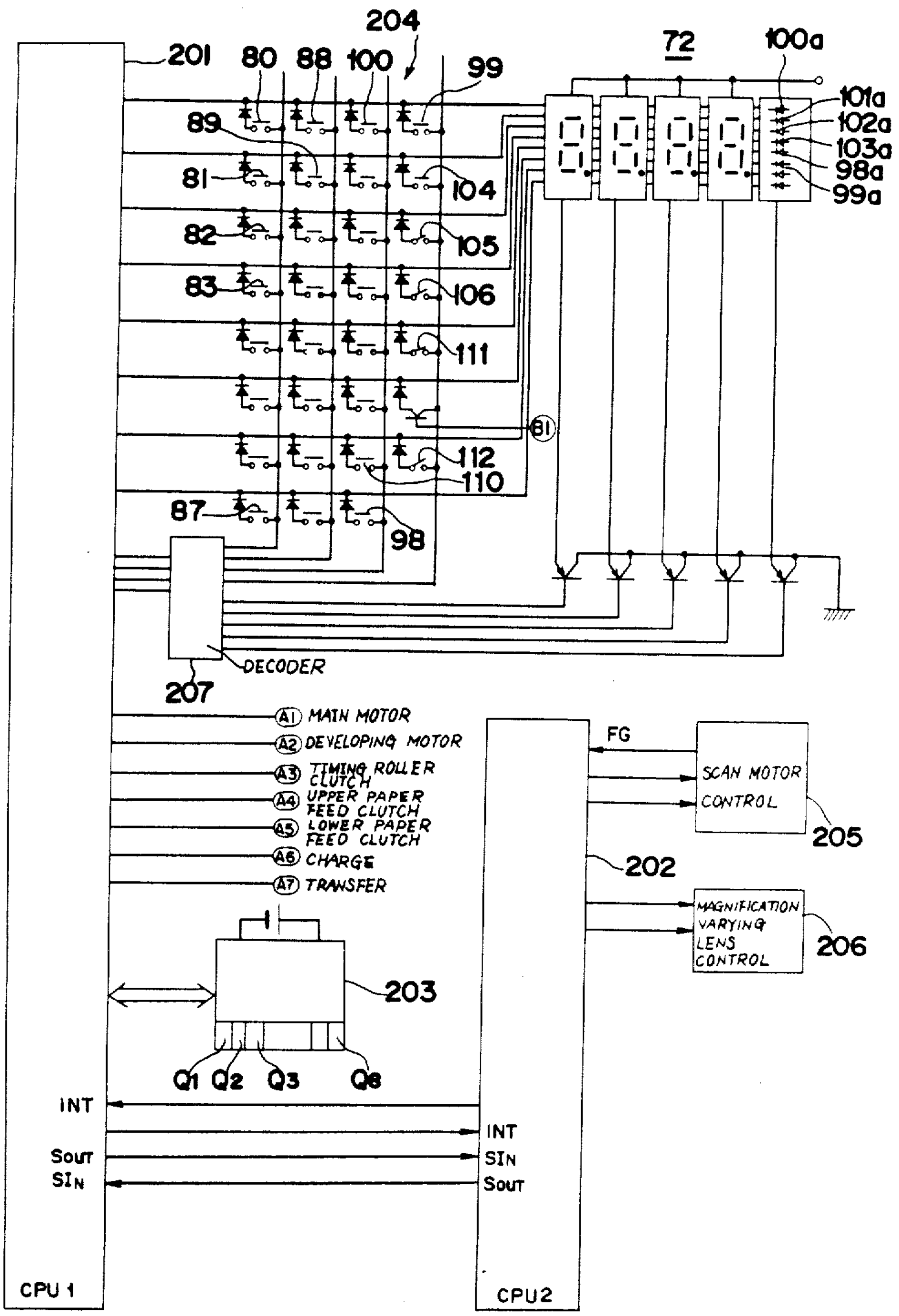
FIG. 6 is a black circuit diagram showing an embodiment of the present invention.
Figure 7:
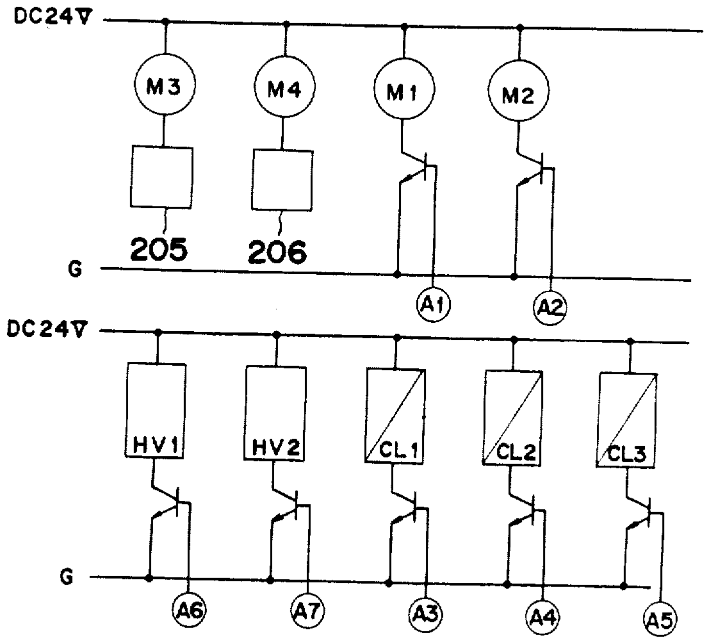
FIG. 7 is an output circuit diagram applicable to the embodiment shown in FIG. 6.

In FIG. 6, there is shown a circuit for controlling the copying magnification setting device according to the present invention, which comprises a first CPU (central processing unit) 201, a second CPU 202, a RAM (random access memory) 203 backed up by batteries, a switch matrix 204, a driving circuit 205 for driving the DC motor M3 for scanning an original document to be copied, a driving circuit 206 for driving the stepping motor M4 for changing the copying magnification and a decoder 207. Output terminals A1 through A7 are respectively connected to switching transistors (FIG. 7) for driving a main motor M1, a developing motor M3, a timing roller clutch 26 (CL1), an upper paper feeding clutch 21 (CL2), a lower paper feeding clutch 23 (CL3), the charger 5 (HV.1) and the transfer charger 7 respectively.

The RAM 203 stores various data for controlling the copying operation written in the RAM 203 or shifted to it from a ROM (read only memory) (not shown) arranged in the CPU 201, and is provided with memory locations Q1, Q2, Q3 and Q4 such that, e.g., the magnification displayed in the display unit 72 is written in or read from the memory location Q1 when the selection key 100 is turned on while the magnification is written in or read from the memory location Q2 when another selection key 101 is turned on, as hereinafter described in detail.

With respect to the selection keys 95 through 98, memory locations Q5, Q6, Q7 and Q8 are further provided in a similar manner such that, e.g., the magnification is written in or read from the memory location Q5 when the selection key 95 is turned on.

FIGS. 8*a* through 17*b* are flow charts explanatory of processes for the controlling of the setting of the copying magnification and the copying operation carried out in the first CPU 201. A preferred embodiment of the present invention is hereinafter described in detail with reference to these flow charts.

Figure 8A:
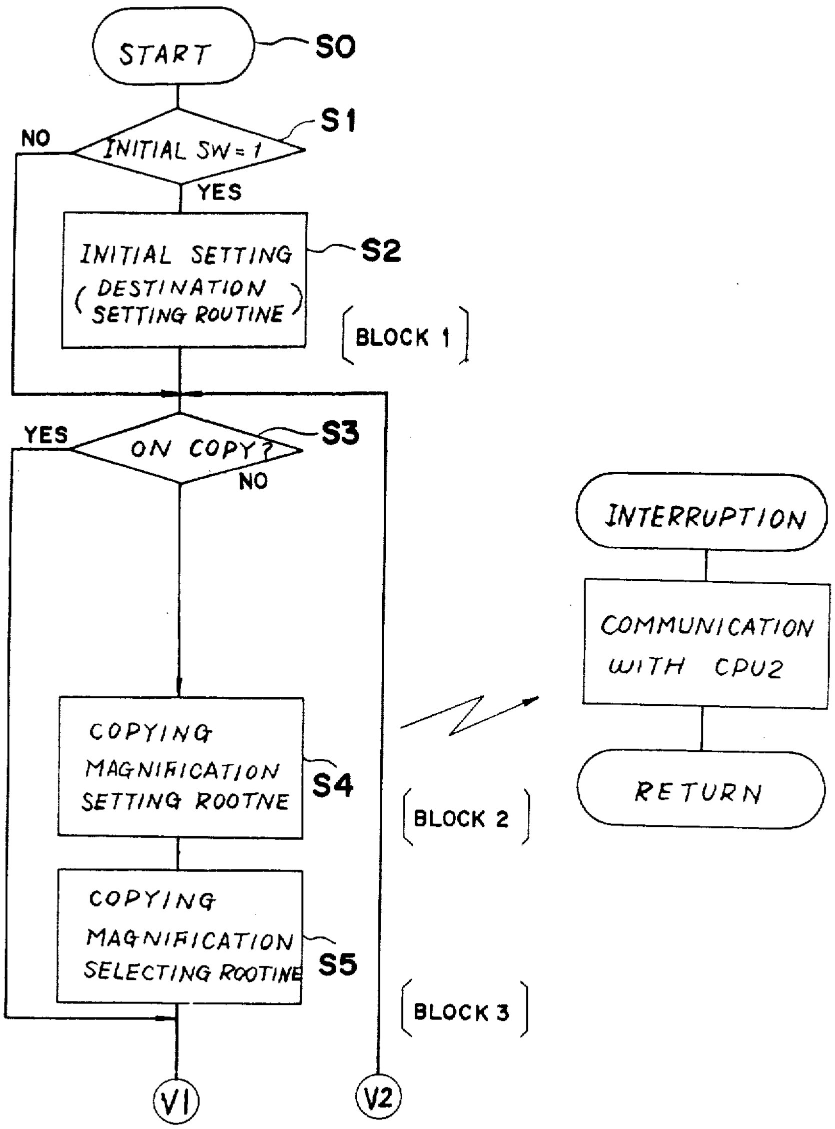
FIGS. 8*a* and 8*b* show a flow chart roughly illustrating operation of an essential portion of the present invention.
Figure 8B:
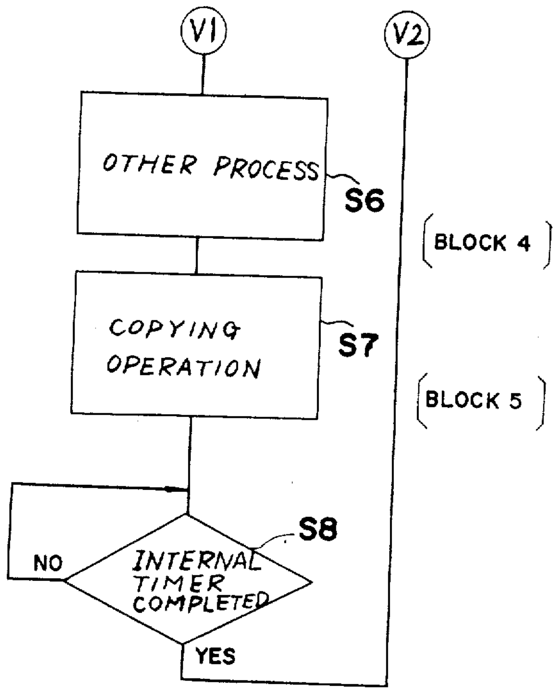

In FIGS. 8*a* and 8*b*, there is shown a flow chart roughly illustrating a general operation of the first CPU 201.

Figure 9:
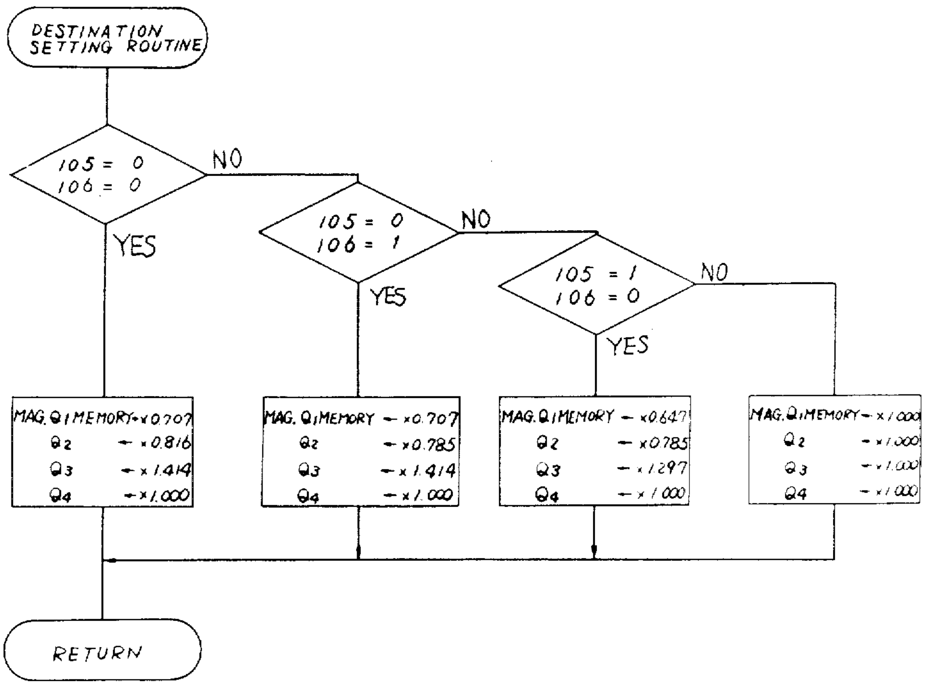
FIG. 9 is a flow chart illustrative of a program for setting a specific copying magnification.

At steps S1 and S2, presetting of the magnification is effected with respect to the memories Q1 through Q4, preferably during the assembling of the copying apparatuses or forwarding of the same from the factory. Details of these steps are shown in FIG. 9.

At steps S3 and S4, magnifications Q1 through Q8 are set in correspondence to the selection keys 95 through 98 or 100 through 103 respectively, when the copying apparatus is not in operation. Details of these steps are shown in FIGS. 10*a* through 12.

At a step S5, data for controlling the position of the projection lens 15 and the speed for driving the motor M4 in correspondence to the magnification set, at the step S4 are transferred to the second CPU 202. Upon the transferring of this data, the second CPU 202 effects a process on the same to control the copying operation. Details of the step S5 are shown in FIGS. 13*A* through 14*b*.

At a step S6, controlling of other factors such as the temperature of a heater of the copying apparatus and selections as to, e.g., the size of a copy paper are effected all together.

Figure 16:
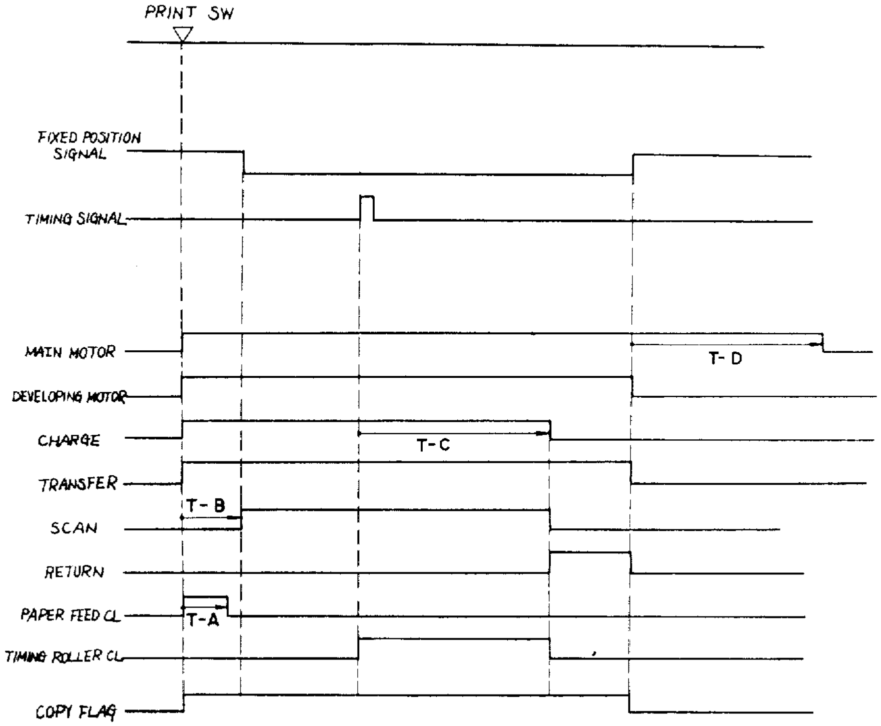
FIG. 16 is a waveform diagram illustrating an essential portion of the copying operation shown in FIGS. 15*a* to 15*c*.

At a step S7, a process for controlling the copying operation is effected. FIG. 16 is a time chart showing the operation of the step S7.

FIG. 9 is a flow chart for illustrating in detail an initial setting process for presetting predetermined values in the memory locations Q1 through Q4 corresponding to the second group of magnification setting keys 100 through 103. An initial switch 104 shown in the step S1 of FIGS. 8*a* and 8*b* is set in a normally inaccessible position of the copying apparatus (FIG. 1) so that the switch 104 may be freely operated only in assembling of the apparatus in a factory or by a maintenance, engineer and the process shown in FIG. 9 is effected only when the switch 104 is operated.

The values to be preset in the memory locations Q1 through Q4 are determined by conditions of switches 105 and 106 (FIG. 1) which are turned on or off following operation of switch 104. That is, in the assembling of the copying apparatus or forwarding of the same from the factory, the switches 105 and 106 are operated to be on or off by an operator according to a predetermined combination, so that when the initial switch is closed the predetermined values are stored in the memory locations Q1 through Q4. The subsequent process is for setting the magnification, with respect to combinations of ON and OFF of the switches 105 and 106, which are stored in the first CPU 201, and examples of the preset values with respect to combinations of ON and OFF of the switches 105 and 106 are shown in Table 1.

TABLE 1

| SWITCH | | MAGNIFICATION | | | |
|---|---|---|---|---|---|
| 105 | 106 | Q1 | Q2 | Q3 | Q4 |
| 0 | 0 | 0.707 | 0.816 | 1.414 | 1.000 |
| 0 | 1 | 0.707 | 0.785 | 1.414 | 1.000 |
| 1 | 0 | 0.647 | 0.785 | 1.287 | 1.000 |
| 1 | 1 | 1.000 | 1.000 | 1.000 | 1.000 |

In FIGS. 10*a* through 12, there is shown a process for setting the copying magnifications in the memory locations Q1 through Q8 corresponding to the selection keys 95 through 98 and 100 through 103.

Figure 10A:
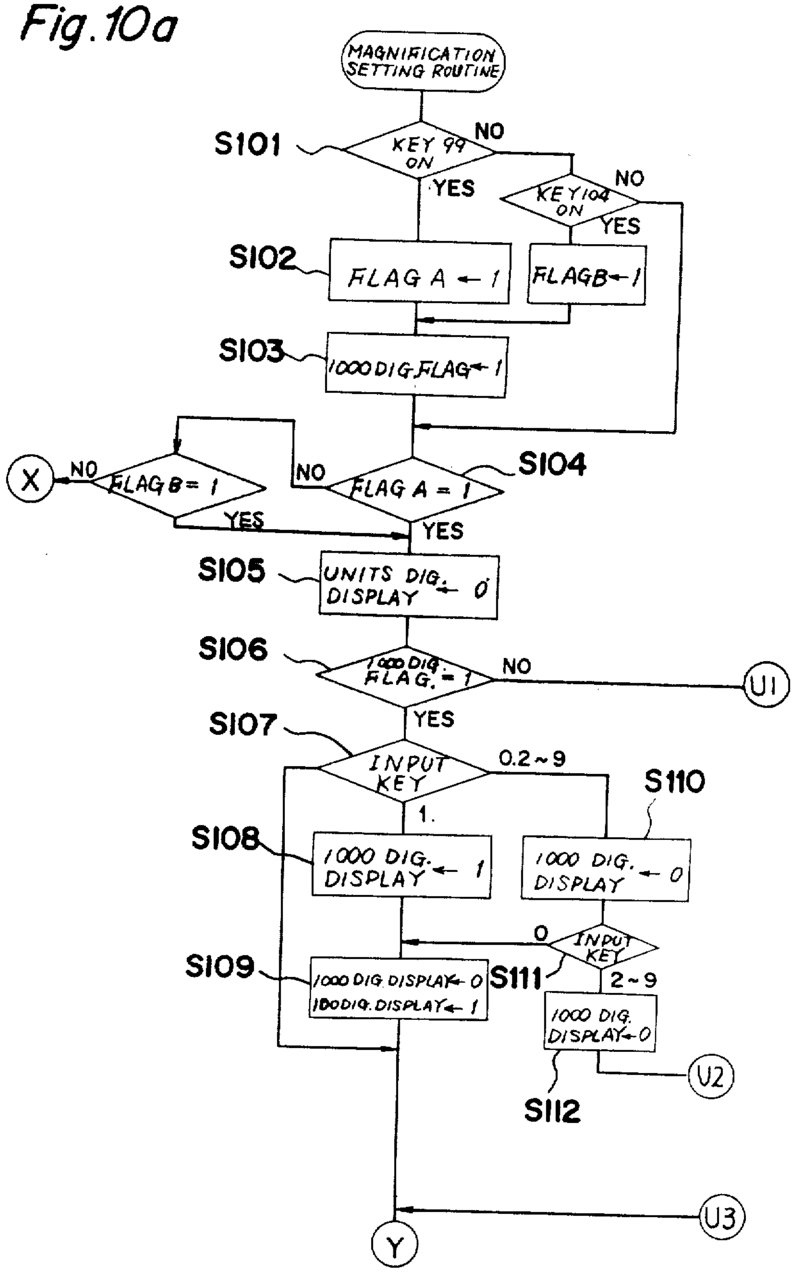
FIGS. 10*a* and 10*b* show a flow chart illustrative of a way of indicating the set magnification.
Figure 10B:
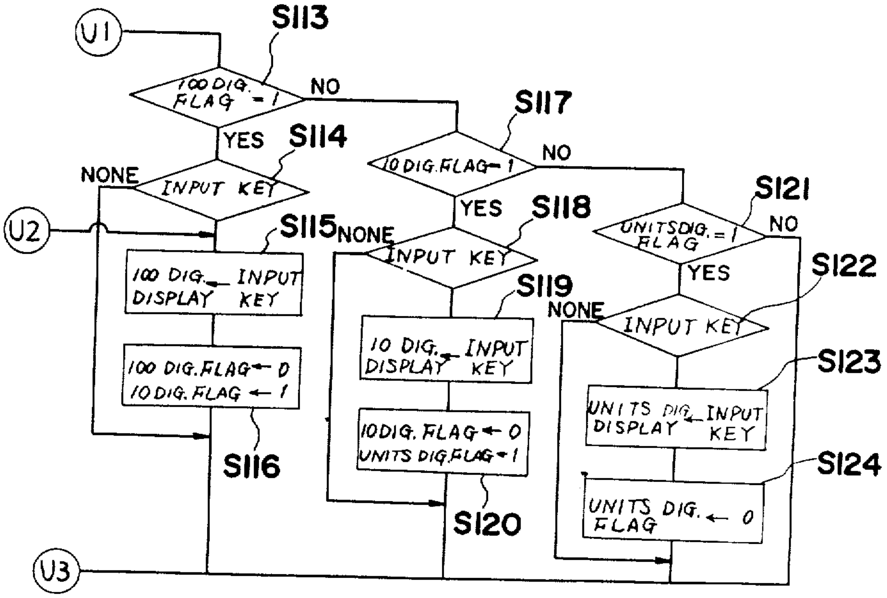

At steps S101 and S102 in FIGS. 10*a* and 10*b*, selection is made as to on which group of keys setting of magnification is required when the switch 99 or 104 is operated to switch the control mode to the copying magnification setting mode. The control mode is switched to the first copying magnification setting mode upon operation of the key 99, and a value "1" is set in a flag A. On the other hand, when the key 104 is operated, the value "1" is set in a flag B showing the second copying magnification setting mode.

When either the key 99 or 104 is thus operated, a process is effected for making the thousands digit flag "1" while making the units digit display "0" at the steps S103 and S105. That is, when the control mode of the copying apparatus is switched to either magnification setting mode, a display "bbb0" (b indicates a blank) is shown on the display device 72, and the copying apparatus is in a stand-by condition for receiving an input from the thousands digit column.

When the ten keys 80-89 are operated in the aforementioned condition, which of the keys 80-89 is operated is determined at a step S107, and the process is advanced to a step S108 only when a "1" key 80 is selected to indicate that the thousands digit flag is "1". The input values are expressed herein as the thousands digit, the hundreds digit, the tens digit and the units digit in consideration of the relation with the numerical value display device 72, though, it is to be noted that values indicating the copying magnifications are processed as decimal numbers ranging from down to three decimal places up to an effective number of four figures, with three decimal places.

In a case where the thousands digit flag is "1" and the input value is 0 or one of 2 through 9, the process is advanced to a step S110 for displaying "0" as the thousands digit. Then, if the input is "0", the process is advanced to a step S109 as in the case of "1" to make the thousands digit flag "0" while making the hundreds digit flag "1" for standing by for an input to the hundreds digit column. On the other hand, when the input is one of 2 through 9, the thousands digit flag is made "0" at a step S112 and then the process is advanced to a step S115 to display the input value as the hundreds digit.

The aforementioned process, effected when the thousands digit flag is "1", is based on the premise that values within the range of 0.647 to 1.414 are considered effective as the copying magnification values. Consequently, only "1" or "0" can be displayed as the thousands digit. By virtue of this, operation for inputting "0" as the thousands digit may be simplified. However, it is to be noted that, even in the aforementioned process, the copying magnification value might deviate from the aforementioned range depending on the values input below the hundreds digit. Such a case is hereinafter described with reference to a sub routine shown in FIGS. 11*a* through 11*c* and FIG. 12.

The hundreds digit flag is made "1" upon input of a value to the thousands digit column, and when one of the ten keys 80-89 is operated under this condition, a value corresponding to the operated key 80-89 is input in the hundreds digit column so that said value is displayed at a step S115 and a process is effected at a step S116 to make the hundreds digit flag "0" while making the tens digit flag "1". Input of values to the tens digit and units digit columns is effected in a similar manner by operation of the ten keys 80-89.

Figure 11A:
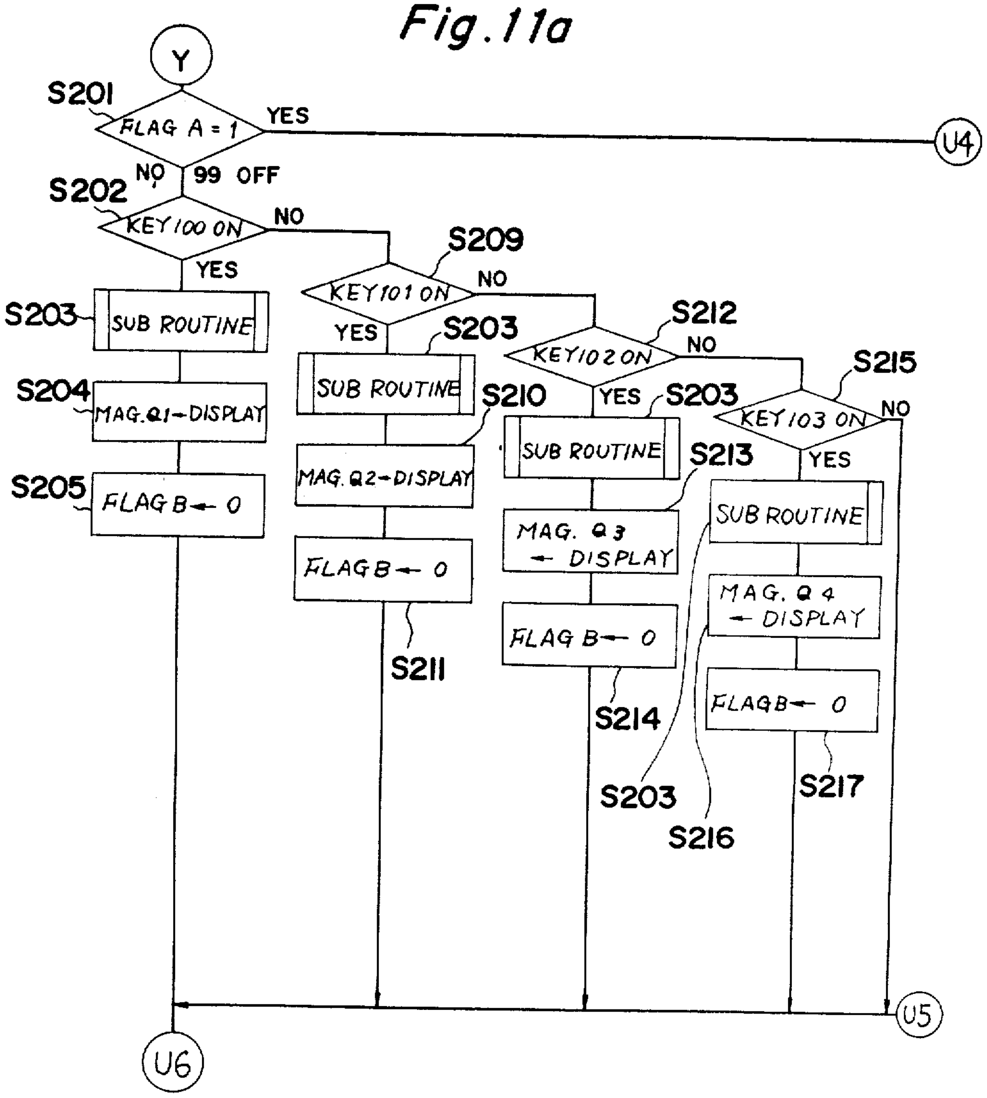
FIGS. 11*a*, 11*b* and 11*c* show a flow chart illustrating a magnification setting program in a first setting mode in detail.
Figure 11B:
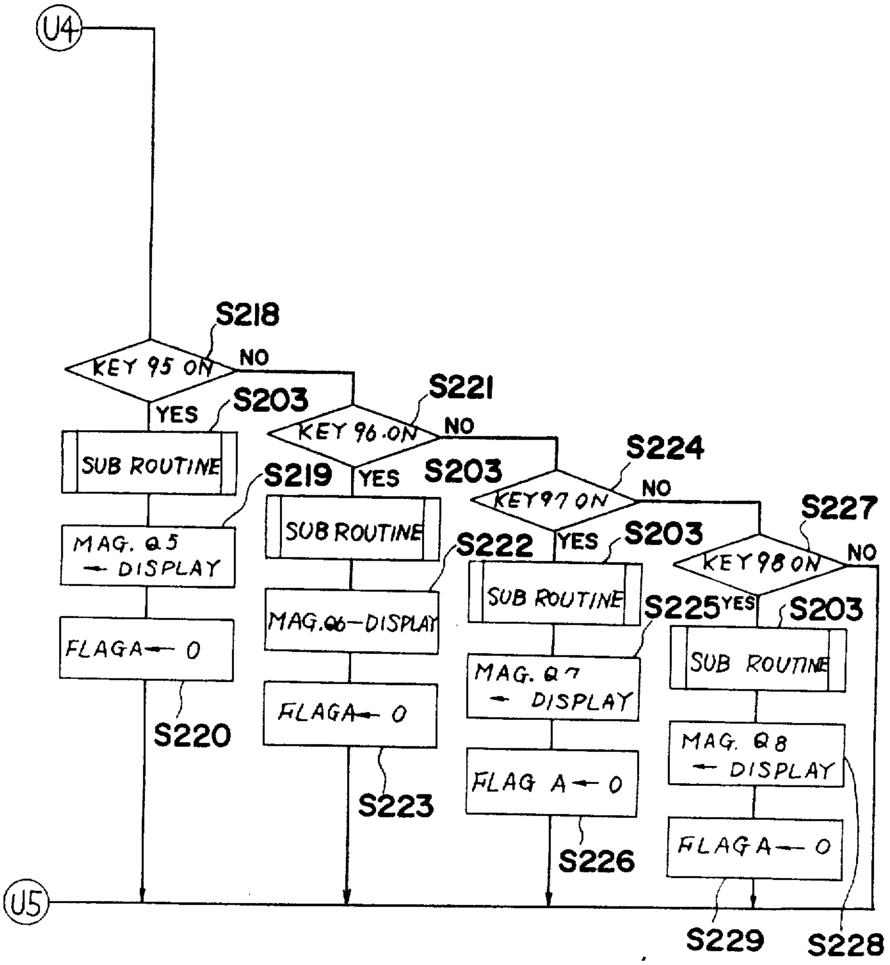
Figure 11C:
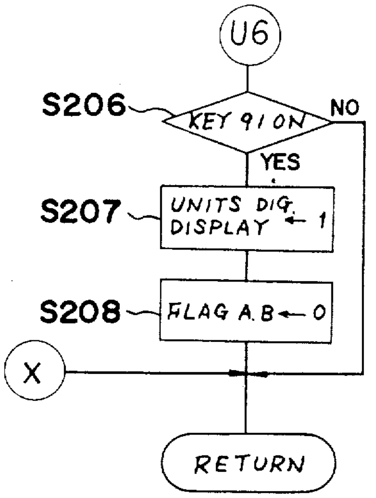

FIGS. 11*a* through 11*c* show a flow chart showing a process of storing the value input and displayed by the process of FIGS. 10*a* and 10*b* in a memory location corresponding to the selection key 95-98, 100-103 operated in the subsequent stage.

At a step S201, a determination is made as to whether the control mode is in the first magnification setting mode or in the second magnification setting mode. Since the process of the step S201 is effected only when either the flags A or B is at "1", determination at the step S201 is carried out as to only whether or not, e.g., the flag A is "1". When the flag A is "1", the control mode is in the first magnification setting mode and the process is advanced to a step S218 for determinations based upon operations of the first group of keys 95 through 98. When the flag A is not "1", i.e., when the flag B is "1", the control mode is in the second magnification setting mode and the process is advanced to a step S202 for determinations based upon operations of the second group of keys 100 through 103.

Figure 12:
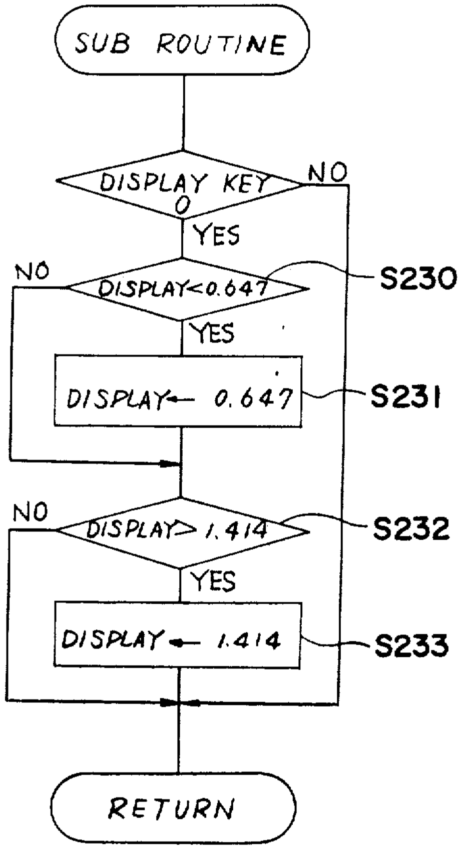
FIG. 12 is a flow chart illustrating magnification setting programs in first and second setting modes in detail.

In each of the steps as shown in FIGS. 11*a* through 11*c*, a basic process is effected in which a displayed value is stored in a memory location corresponding to the operated selection key 95–98, 100–103. However, in such a stage, a value deviating from an allowable range of the copying magnifications might be displayed as hereinabove described. Therefore, in the process of FIGS. 11*a* through 11*c*, a sub routine indicated by a step S203 is effected following determinations of the operation of each key 95–98, 100–103 so that the deviating value is not stored in the RAM memory 203. FIG. 12 shows the process effected at the step S203.

When the displayed value is not "0" in FIG. 12, a determination is made as to whether or not the displayed value is smaller than 0.647, and if the determination is "Yes", the value 0.647 is displayed at a step S231. Further determination is made at a step S232 as to whether or not the displayed value is larger than 1.414, and if the determination is "Yes", the value 1.414 is displayed at a step S233.

Thus, with reference to FIGS. 11*a* through 11*c*, when a predetermined selection key is operated in a magnification setting mode and a displayed value is out of the allowable range, the display is considered an allowable limit value, and thereafter the displayed value is stored in a memory corresponding to the selection key. Upon effecting of the process for storing the value in the memory, the flag A is made "0" in case of the first magnification setting mode while the flag B is made "0" in case of the second magnification setting mode, and the process is advanced to a step S206.

Steps S206 through S208 relate to processes effected upon operation of the clear stop key 91 (FIG. 5). When the clear stop key 91 is operated, "bbb1" is displayed in the display device 72 at the steps S207 and S208 while the flags A and B are made "0". That is, upon operation of the clear stop key 91, the value that has been displayed is cleared and the magnification setting mode is released. Therefore, the value "1" displayed in this process is indicative of a reference value of the copy number.

In FIGS. 13*a* through 14*b*, there are shown processes effected upon operation of the second group of selection keys 100 through 103 and the first group of selection keys 95 through 98 respectively.

Figure 13A:
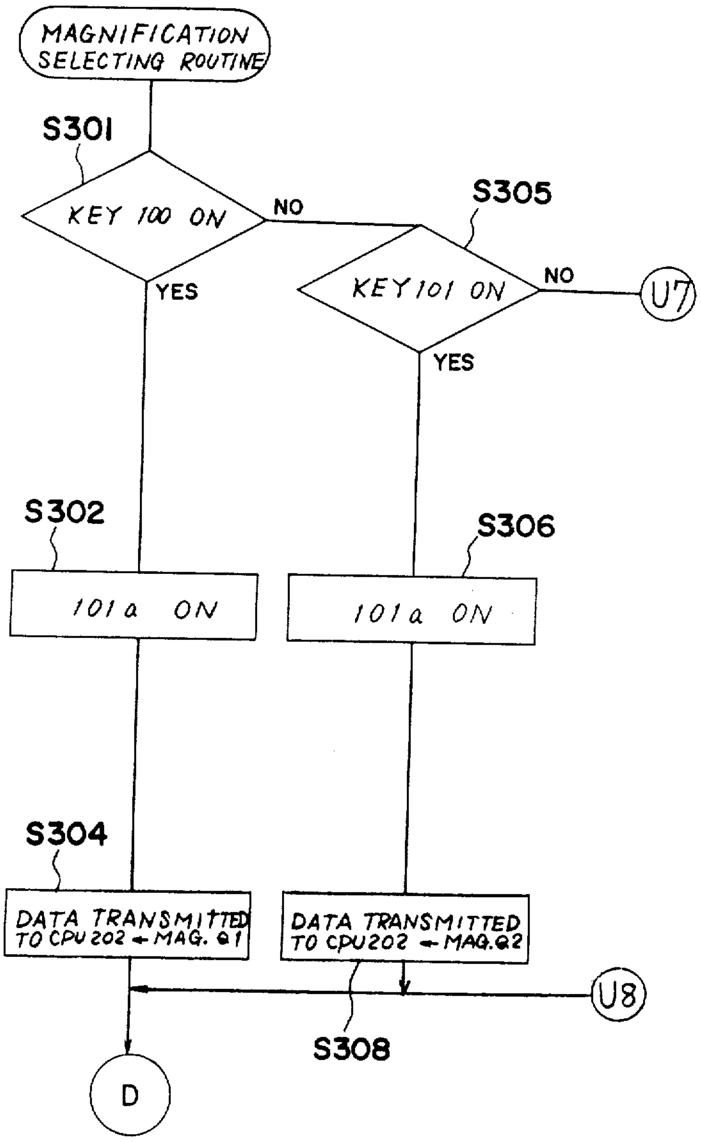
FIGS. 13*a* and 13*b* show a flow chart illustrating sub routines of FIG. 12 in detail.
Figure 13B:
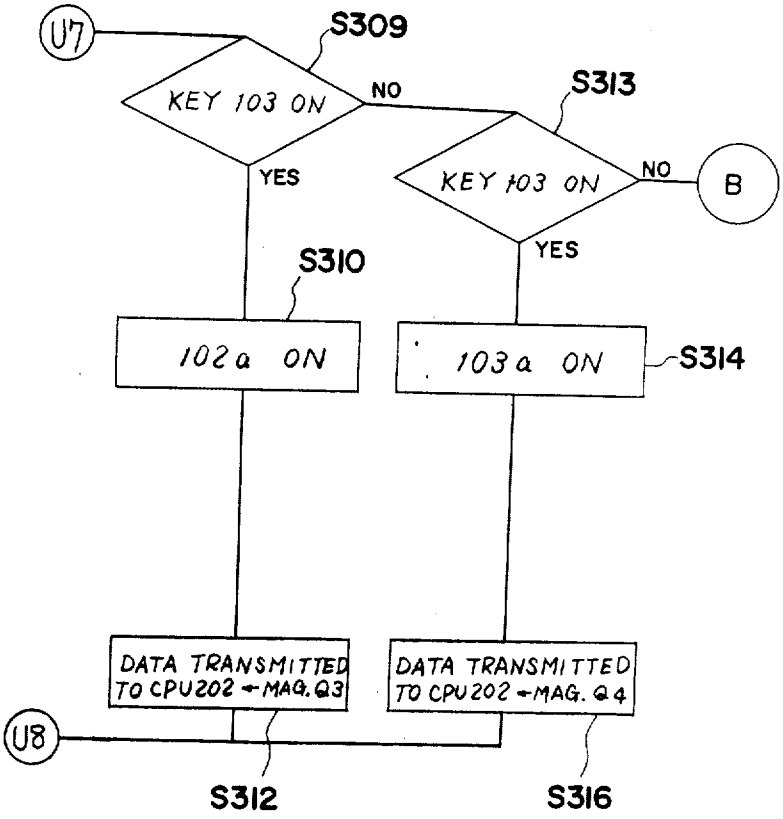
Figure 14A:
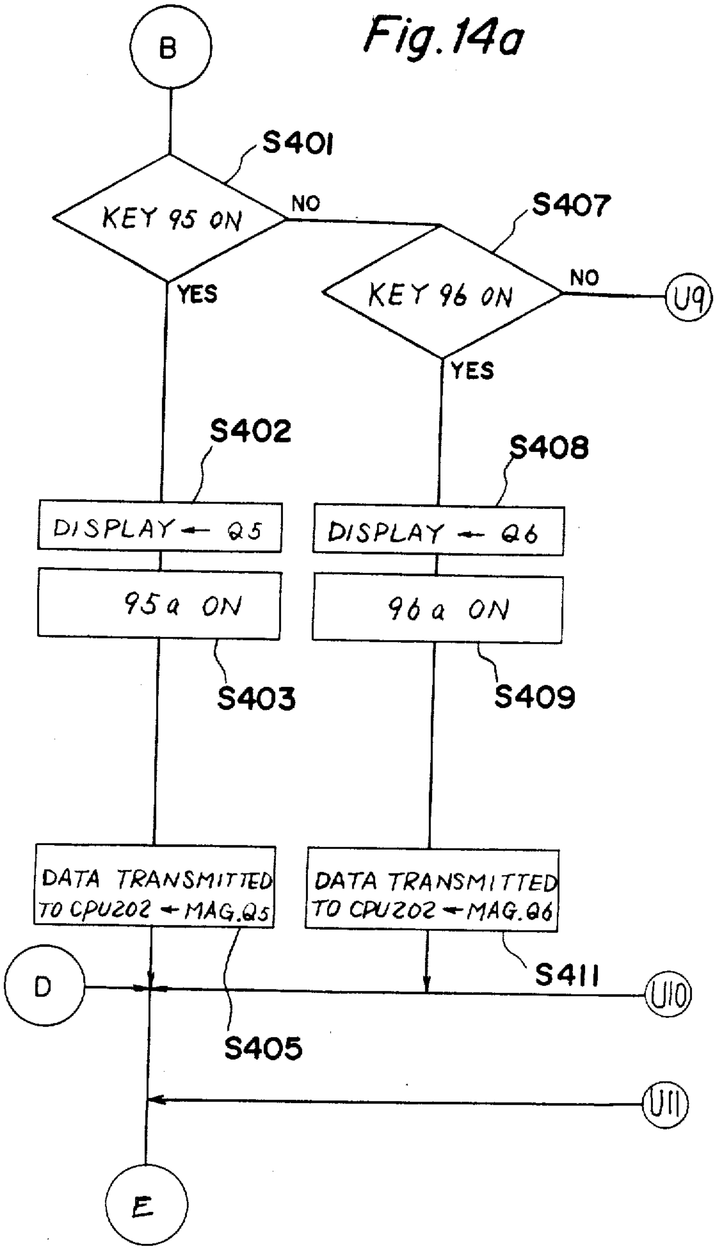
FIGS. 14*a* and 14*b* show a flow chart illustrative of a program for reading an optional copying magnification.
Figure 14B:
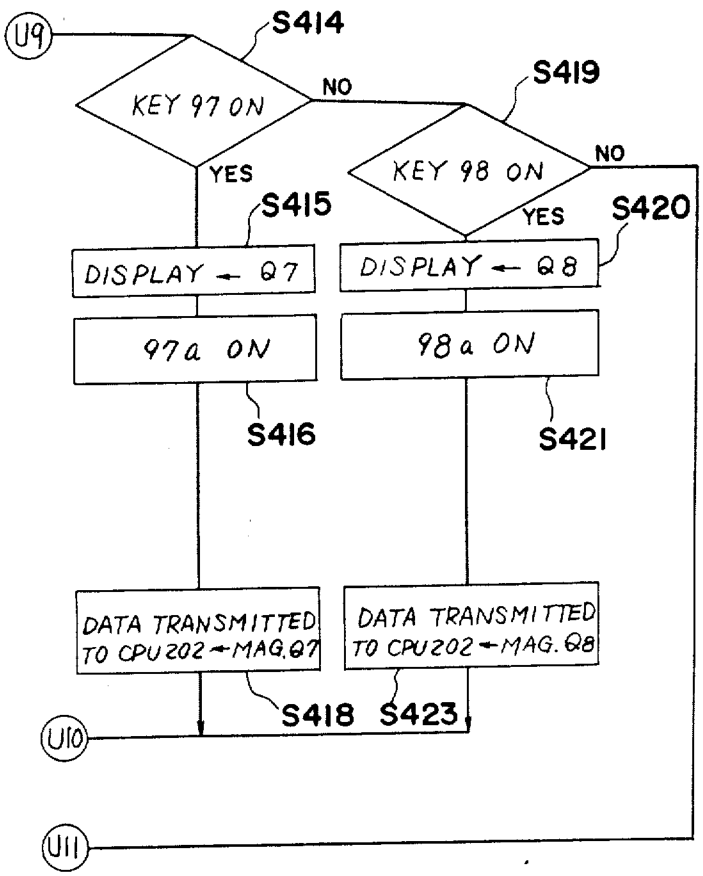

When one of the keys 100, 101, 102 and 103 is operated in FIGS. 13*a* and 13*b*, one of light emission diodes 100*a*, 101*a*, 102*a* and 103*a* (FIG. 5), provided respectively in correspondence to the keys 100–103, is turned on so that the value stored in the corresponding memory location is transferred as the magnification data to the second CPU 202, and the process is advanced to a step S401 in FIGS. 14*a* and 14*b*.

When one of the selection keys 95 through 98 is operated in FIGS. 14*a* and 14*b*, the corresponding light emission diode 95*a*–98*a* is turned on while the value set in the corresponding memory location Q5 through Q8 corresponding to the key 95–98 is displayed in the display device 72 at steps S402, S408, S415 and S420, since the magnification can be selectively set in this condition. Such a display is effected only when, e.g., each of the respective keys 95–98 is depressed, and upon releasing of the key 95–98, a selected magnification ratio stored in the other memory device is accessed to be displayed in the display device 72.

Figure 17A:
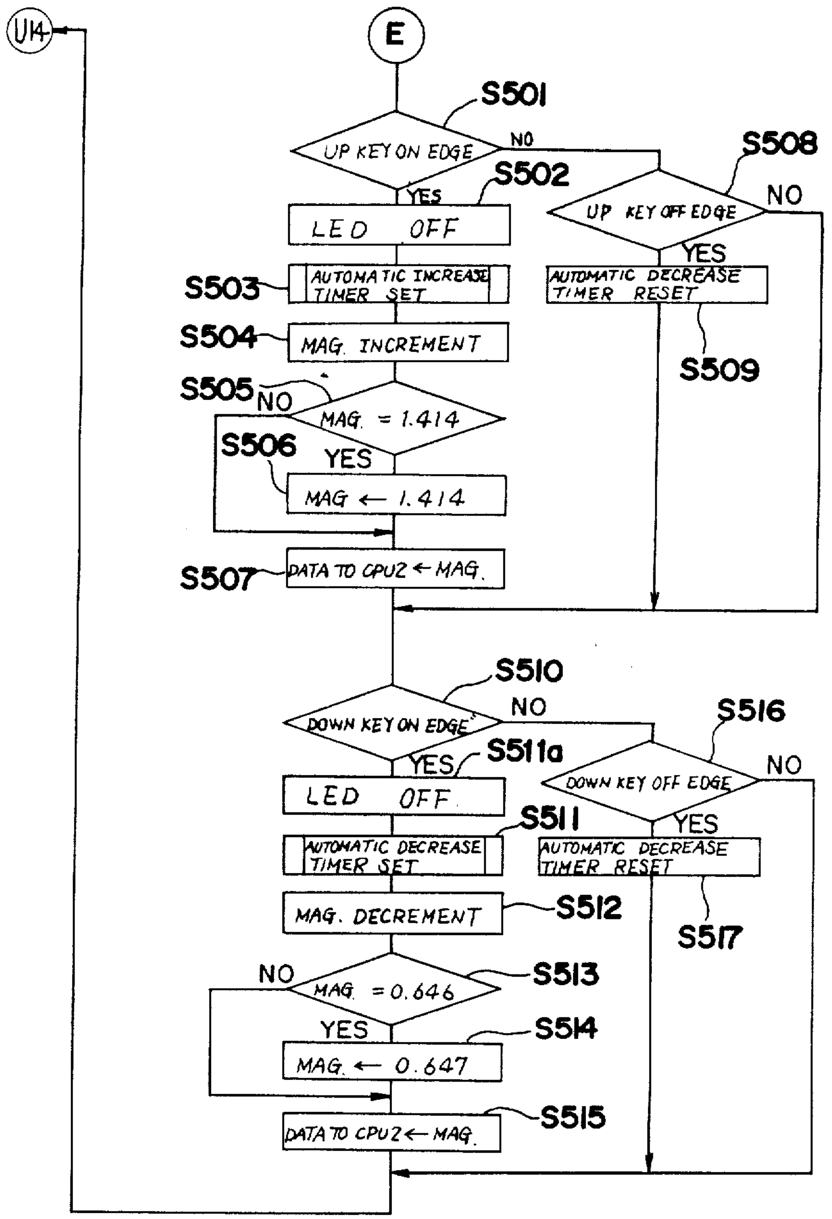
FIGS. 17*a* and 17*b* show a flow chart illustrative of a process for operating an interruption key.
Figure 17B:
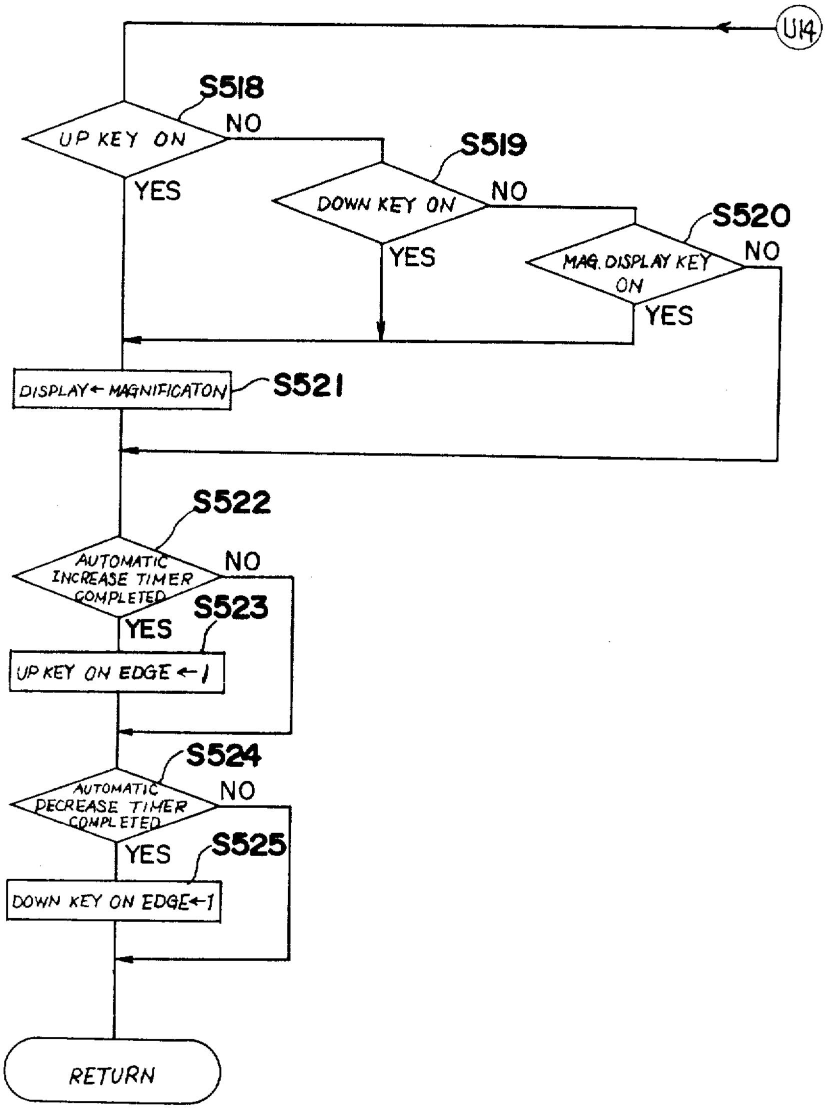

FIGS. 17*a* and 17*b* show a flow chart showing a system for setting the magnification by operating an UP key 111 and a DOWN key 112.

In this case, the process is advanced via a step E in the flow of FIGS. 14*a* and 14*b* to a step S501 of FIGS. 17*a* and 17*b*. A determination is made on a rising edge in which the UP key 111 is turned on, and if the determination is "Yes", one of light emission diodes 95*a* through 103*a*, said one corresponding to the presently selected magnification setting key 95–98, is turned off at a step S502, and an automatic increase timer is set at a step S503. When counting in the automatic increase timer for a predetermined time period of, e.g., 0.5 seconds is completed at steps S522 and S523, a positive going signal is generated in a similar manner to a case where the UP key 111 is turned on. Then, at a step S504, the magnification is increased by 1 unit (e.g., 0.002) in the CPU 201, and the process is advanced to a step S505. At steps S505 and S506, a determination is made as to whether or not the magnification equals or exceeds 1.415, to limit the magnification to 1.414, i.e., not to exceed 1.414.

Information of the magnification value is transmitted at a step S507 to the second CPU202, to enable copying operation at the set magnification value.

At steps S518, S519 and S520, a determination is made as to whether or not one of the UP key 111, the DOWN key 112 and the magnification key 110 has been turned on, and the magnification is displayed on the display device 72 only when the determination is "Yes".

The process, is advanced to the subsequent step S522, at which the counting state of the increase timer is read to make a determination of "Yes" showing that counting in the increase timer is completed at the step S522 after a lapse of a period of, e.g., 0.5 seconds from setting of the timer, so that a signal is generated in a similar manner to a case where the UP key 111 rises. Then the process is returned to the step S501. The aforementioned operation is repeated for a period during when the UP key 111 remains "on", and the magnification is increased by 0.002 every 0.5 seconds.

When the UP key 111 is turned off, a determination is made on a negative going edge of the UP key signal and the process is advanced to a step S509, at which the increase timer is reset to finish the change of the magnification.

When the DOWN key 112 is turned on, the process is advanced to a step S510 through steps S501 and S508, and upon a determination that the DOWN key 112 has been turned on, one of the light emission diodes 95*a* through 103*a* corresponding responding to the magnification key 95–98 at a step S511*a* is turned off so that an automatic decrease timer is set at a step S511. Then the magnification is decreased every 0.5 seconds by 0.002 at a step S512.

The aforementioned operation is continued for a period during when the DOWN key, 112 remains "on". When the magnification is decreased equal to or below 0.646, the value is corrected to 0.647 at a step S514, thus being prevented from further decrease.

It is to be noted that the aforementioned magnification setting operation is performed for correcting the magnifications that have already been stored in the memory locations Q1 through Q8, and the magnifications are returned to initially set values after one or a series of copying operations are completed with the corrected magnifications.

When the UP key 111 is turned on once for a short period of time, the magnification can be increased by the unit value of 0.002. On the other hand, when the DOWN key 112 is turned on once for a short period of time, the magnification is decreased by the unit value of 0.002.

In operation of the UP key 111 and the DOWN key 112, the display device 72 may continuously hold the value read in advance of the operation of said UP and DOWN keys without changing its display, with arrangement of another display device showing the number of times of magnification changes or a display lamp flashed upon every change of the value.

The UP key 111 and the DOWN key 112 may be kept "on" while increasing the speed of change of values in compliance with the time for operating the keys.

As obvious from the aforementioned description with respect to the setting operation in the copying magnification setting device according to the present invention, selected copying magnifications required by respective operators may be easily set by utilizing the first magnification setting mode, and the set value can be accessed whenever the data is required, so that the value is used as a control data for the copying apparatus while confirming said value by display. According to the second copying magnification setting mode, on the other hand, the copying magnification can be simply corrected by access to an error between a copy actually obtained from the preset copying magnification and a calculated copying magnification.

In operation of the UP key 111 and the DOWN key 112, further, a desired copying magnification can be easily obtained by minutely adjusting the preset magnification value whenever minute adjustment is required. Such operation is effective in utilization of a value which is rarely used.

In the meantime, movement of the lens 14 is controlled by the control device 206 based upon the output from the second CPU 202 according to the copying magnification data whereby the stepping motor M4 is controlled to be rotated in a forward or reverse direction by, e.g., one pitch with respect to a value of 0.001 or 0.002. Thus, a minimum adjustable unit of the copying magnification may be related to the display by operating the UP key 111 and the DOWN key 112 to change the magnification by 0.002. The speed of movement of the optical system is also controlled by the control device 205 based upon the output from the second CPU 202 to be variable in correspondence to the set magnification value, though, description of a system for controlling the speed of a DC motor, i.e., the driving source, is not particularly made herein since a plurality of systems of this kind have generally been proposed or provided such as that disclosed in U.S. Pat. No. 4,330,196.

Returning to FIG. 5, a panel member 70a adjacent to the first group of selection keys 95 through 98 may be formed by a white board, a detachable sticker or a detachable magnetic panel to and from which information can be written and erased by a specific pen, so that an operator may write in the panel items used with respect to a value selected by the operator, e.g., "letter size or legal size to A4 size". The panel member 70a may be upwardly or downwardly stepped from other portions if necessary.

Copying Operation

Figure 15A:
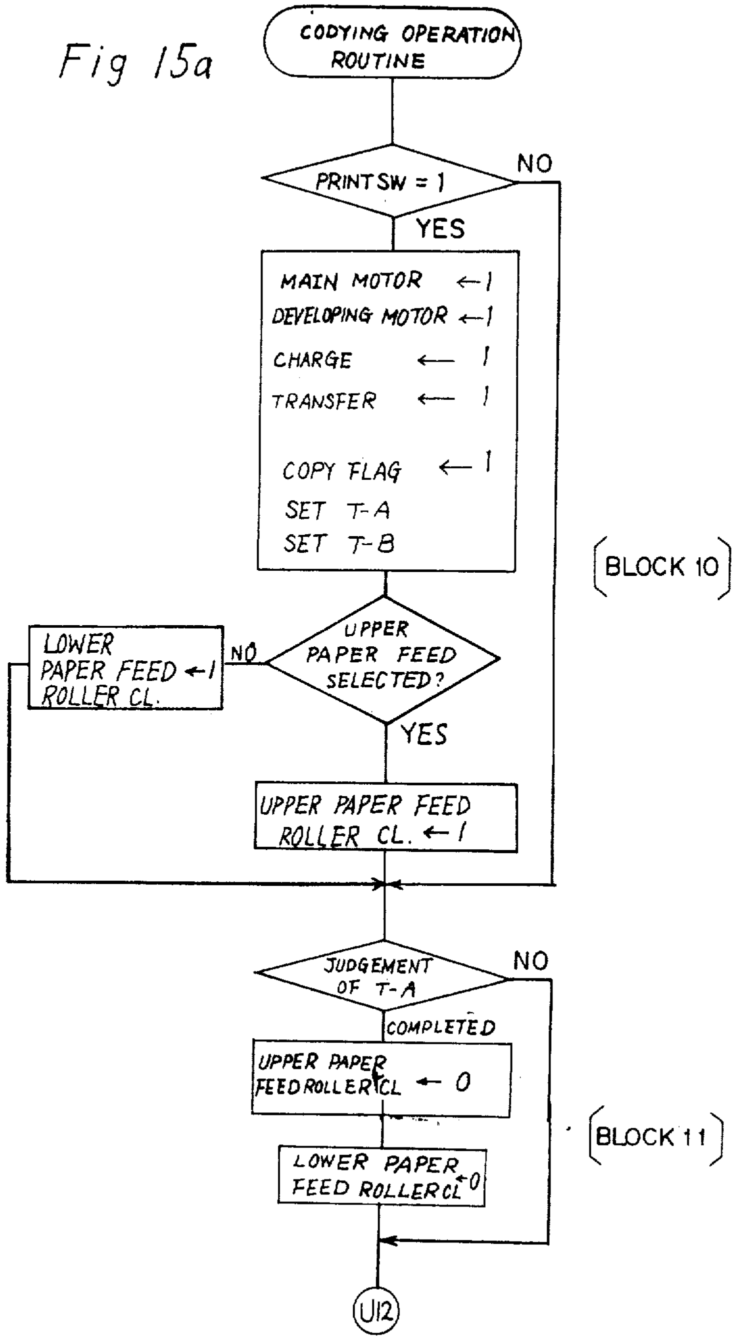
FIGS. 15*a*, 15*b* and 15*c* show a flow chart illustrative of a copying operation.
Figure 15B:
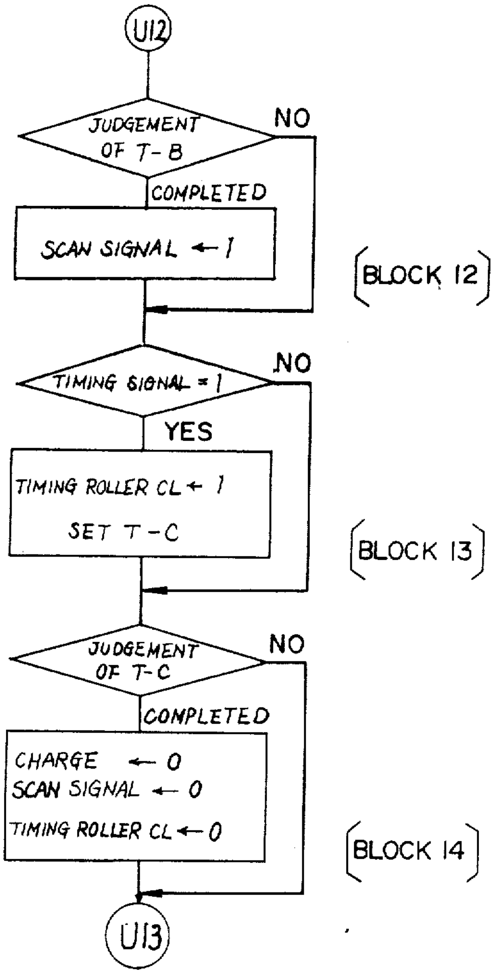
Figure 15C:
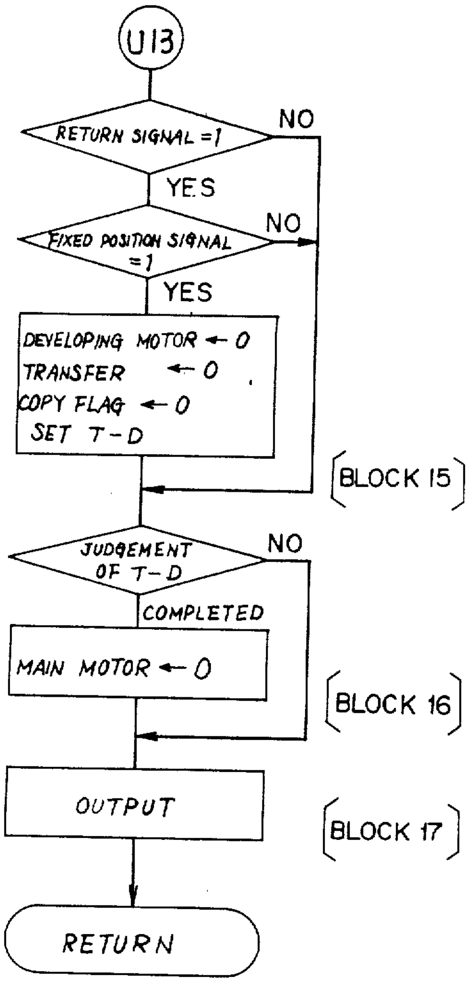

FIGS. 15a through 15c show a flow chart showing an example of operation control of the copying apparatus. This chart is now briefly described with reference to a time chart of FIG. 16.

In a block 10, when a print switch is turned on, the main motor M1, the developing motor M2, the corona charger 12 and the transfer charger 14 are respectively operated while a copy flag showing that the device is in copying operation is set at "1" and control timers T-A and T-B are driven to turn on the clutch of a selected paper feed roller.

In a block 11, a determination is made on completion of the operation of the timer T-A, to turn off the paper feed roller.

In a block 12, a determination is made on completion of operation of the timer T-B, to turn on a scan motor M3 for initiating the scanning operation.

In a block 13, a process is effected to turn on a timing roller clutch CL3 when a timing signal is generated during the scanning operation while setting a timer T-C. A copy sheet is transported in synchronization with an image on the photoreceptor drum 10 by a timing roller 35.

In a block 14, a determination is made on completion of operation of the timer T-C, to turn off the corona charger, the scan motor and the timing roller clutch respectively. The timer T-C may be set variable depending on factors such as the size of the utilized copy sheet.

In a block 15, the developing motor M2 and the transfer charger 14 are respectively turned off and the copy flag is set at "0" while a timer T-D is set when the optical system is returned to a set position following a returning operation to turn on a set position switch.

In a block 16, a determination is made on completion of operation of the timer T-D, to turn off the main motor M1.

In a block 17, a process is effected for various kinds of outputs.

The timers T-A through T-D described with respect to the aforementioned flow chart and time chart are digital timers which are programmed to be counted up by "1" per one routine of processing of MC50 effected within a time period defined by an internal timer, and the time up period is stored as a numerical data.

The aforementioned embodiment of the present invention may be modified in various ways as hereinafter described.

Modification 1

Figure 18:
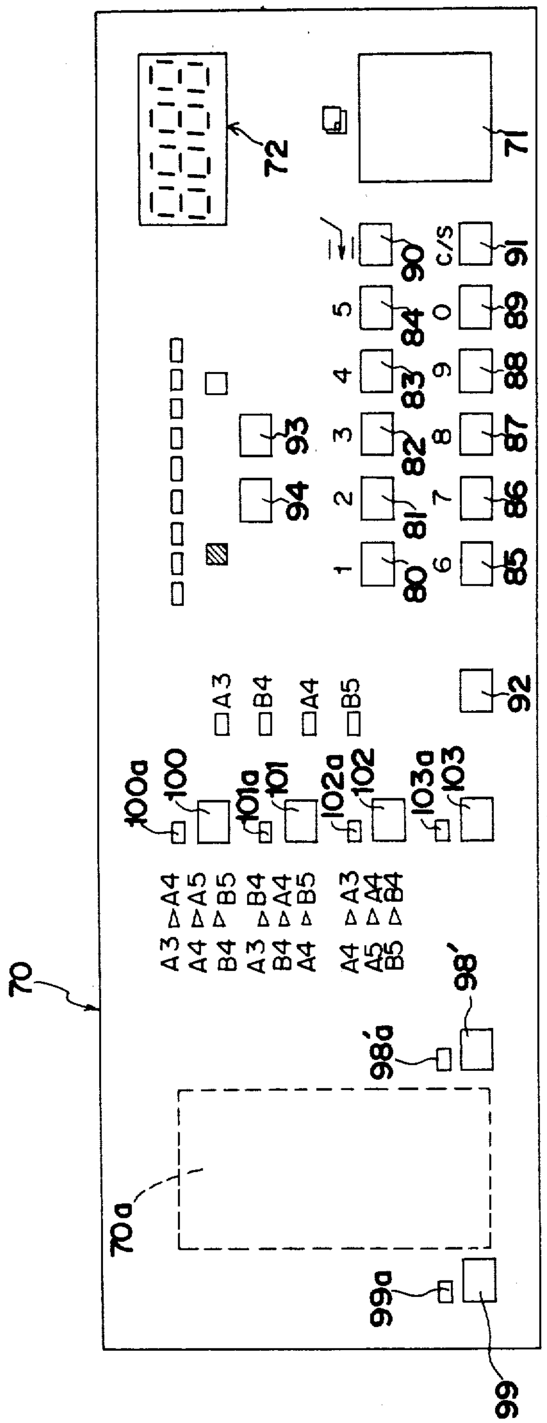
FIG. 18 is a view similar to FIG. 5, which particularly shows a modification thereof.

As obvious from illustration of the control panel 70 shown in FIG. 5, the number of keys for selecting the magnification is increased following increase in number of storeable magnification values in the magnification setting device according to the present invention, and such increase is not necessarily convenient for the operator. Therefore, a first modification of the embodiment of the present invention aims to achieve the function of the aforementioned selection keys 95 through 98 by one magnification selection key 98' provided on the control panel 70 as shown in FIG. 18. In this modification, the processes shown in FIGS. 10a and 10b, 11a through 11c, 13a and 13b and 14a and 14b are modified as shown in FIGS. 19, 20, 21a and 21b and 22a and 22b.

Figure 19:
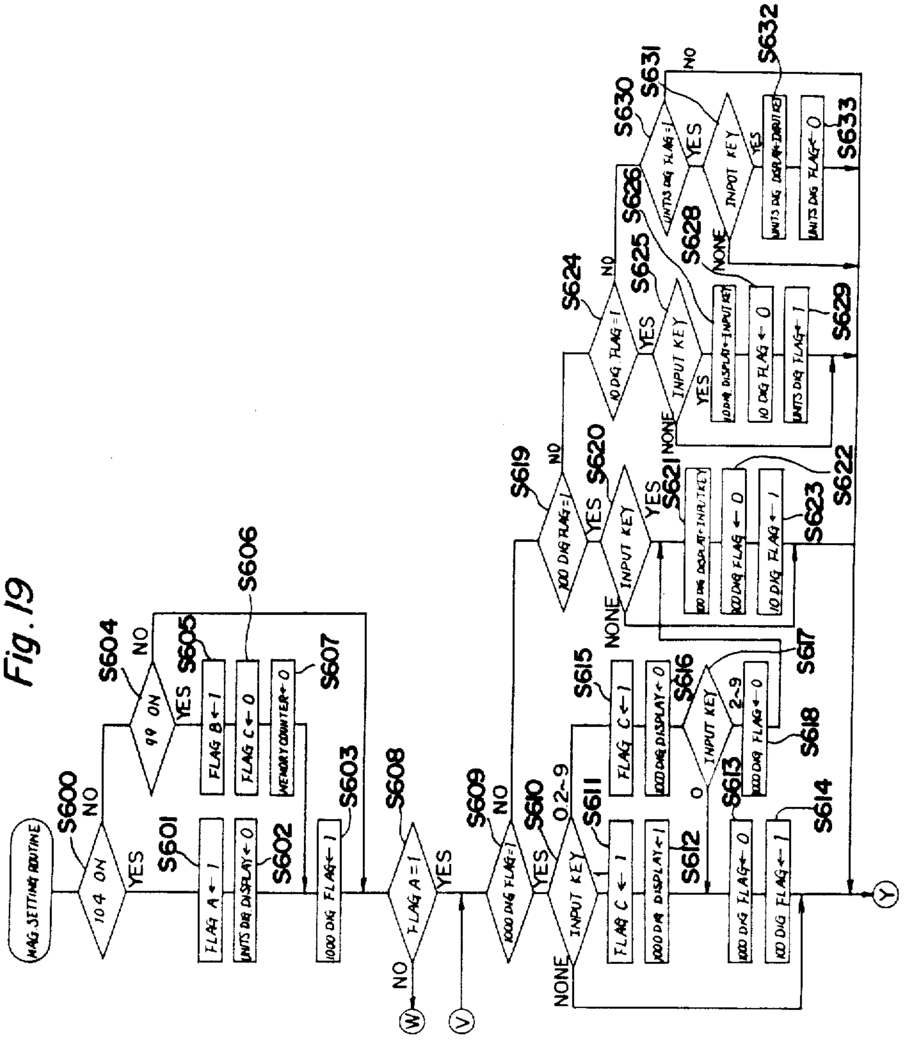
FIG. 19 is a view similar to FIGS. 10*a* and 10*b*, which particularly shows a modification thereof.
Figure 20:
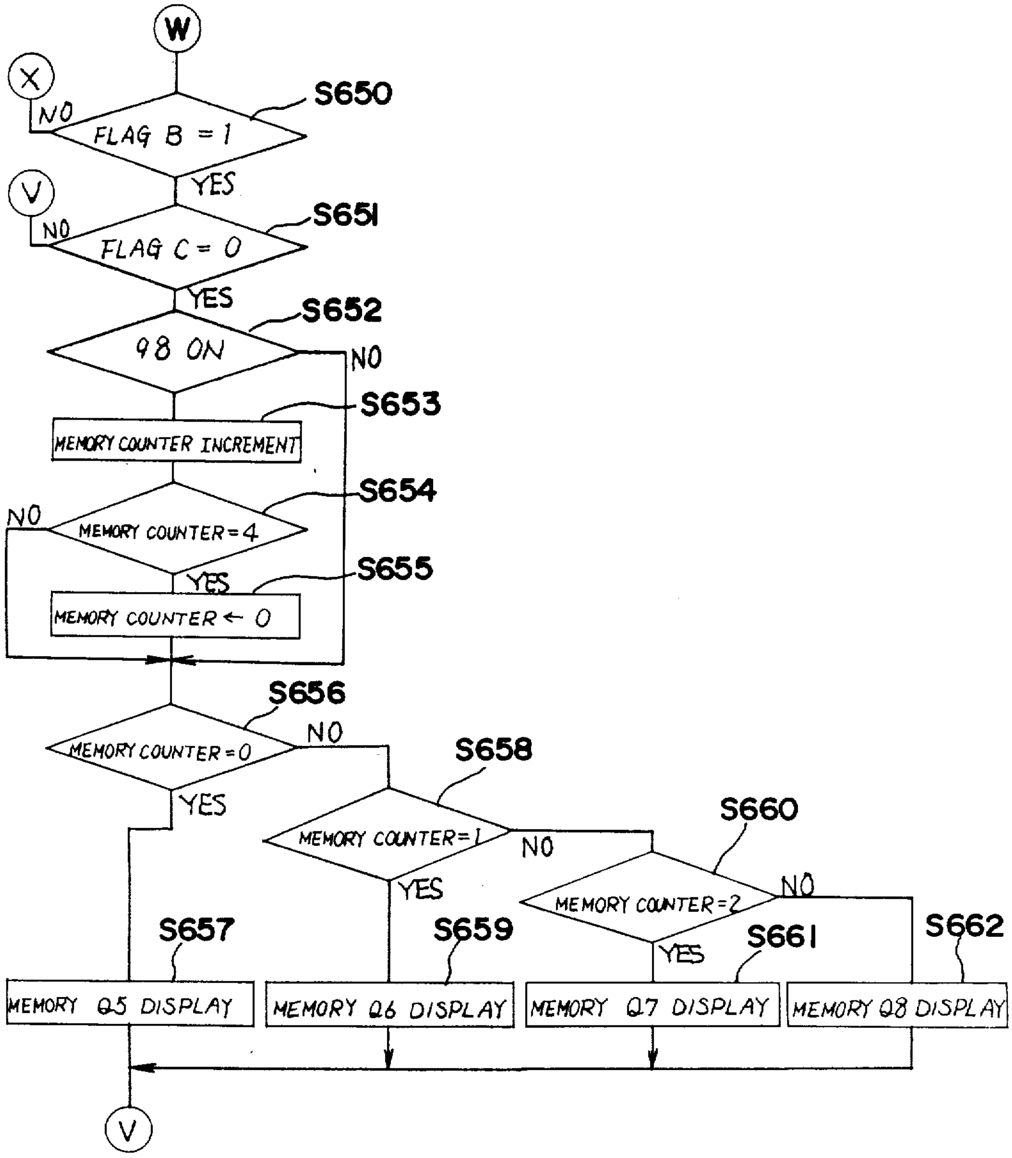
FIGS. 20 through 25 are flow charts illustrative of operations of various modifications of the copying apparatus according to the present invention.

Attention is now drawn to FIGS. 19 and 20, with which it is to be noted that a flag B becomes "1" when a key 99 is turned on while a flag A becomes "1" when a key 104 is turned on for performing a first magnification setting operation. Further, when the ten keys 80–89 are operated, a flag C becomes "1".

When the key 99 is turned on, the flag B becomes "1" at a step S605 while the flag A is "0". If the ten keys 80–89 are not operated, the flag C is "0". Under this condition, the process is advanced to a step S607 at which a memory counter is reset to "0", then a thousands digit flag is made "0" at a step S603, and thereafter the process is advanced to a step S608 and further to a step 650 (FIG. 20) since the flag A is at "0".

When a selection switch 98' is not turned on, the process is advanced through a step S656 to a step S657, at which the value of a copying magnification written in the memory location Q5 is read to be displayed in a display device 72. In this condition, the copying operation, if carried out, is performed at the read magnification value.

Once the selection key 98' is turned on, the count at the memory counter is increased by one to present "1". Then the process is advanced through a step S658 to a step S659, at which the memory location Q6 is designated to read and display a magnification value written in the same, thereby enabling the copying operation at said magnification.

In a similar manner, the count at the memory counter is increased by one every time the selection key 98' is turned on, whereby the magnification written in the memory location Q7 or Q8 is read to enable copying operation at the read magnification value. Then, when the count at the memory counter becomes "4", the counter is reset at a step S655 to be "0" so that the process is returned through the step S656, to the step S657 to read the magnification set in the memory location Q5.

If it is desired to rewrite the magnification value set in, e.g., the memory location Q6 when the count at the memory counter is "1" and the memory location Q6 is designated, one of ten keys 80 through 89 corresponding to the desired magnification is operated so that the process is advanced from the step S651 through V to a step S609, at which a process is effected to rewrite the magnification set in the memory location Q6. This process is hereinafter described in detail.

With respect to a second magnification setting mode, the flag A is made "1" at a step S601 by turning on the key 104. Then, at steps S602 and S603, a process is effected to make the thousands digit flag "1" while making the units digit display "0". That is, when the control mode of the copying apparatus is switched to the second magnification setting mode, the display device 72 displays "bbb0" (b indicates a blank), which shows that the copying apparatus is in a standby condition for receiving input from the thousands digit column.

When the ten keys 80–89 are operated are operated in the aforementioned condition, a determination is made at a step S610 as to the respective one of the keys 80–89 which is the operated key, so that the process is advanced to a step 612 only when the "1" key 80 is operated, to display "1" as the thousands digit. Though the input values are expressed herein as the thousands digit, the hundreds digit, the tens digit and the units digit in consideration of the relation with the numerical value display device 72, the copying magnification values having an effective number of four figures are treated as, decimal numbers ranging from down to three decimal places to four digits with three decimal places.

In a case where the thousands digit flag is "1" and the input value is 0 or one of 2 through 9, the process is advanced to a step S616 at which "0" is displayed as the thousands digit. Then, if the input value is "0", the process is advanced, in a similar manner to the case the input value is "1", through the step S619 to the step S613, at which the thousands digit flag is made "0" while, the hundreds digit flag is made "1" for standing by for an input in the hundreds digit. When, on the other hand, the input value is one of 2 through 9, the thousands digit flag is made "0" at the step S618, and thereafter the process is advanced to a step S621, at which the input value is displayed as the hundreds digit.

The aforementioned process of when the thousands digit flag is "1" is based on the premise that values within the range of 0.647 to 1.414 are considered effective as the copying magnification values. Consequently, only "1" or "0" can be displayed as the thousands digit. By virtue of this, operation for inputting "0" as the thousands digit may be simplified. It is to be noted that, even in aforementioned process, the value of the copying magnification might deviate from the aforementioned range depending on the values input below the hundreds digit. Such a case is hereinabove described with reference to a sub routine shown in FIG. 12.

When a value is input in the thousands digit column, the hundreds digit flag becomes "1", and upon operation of the ten keys 80–89 under this condition, a value corresponding to the operated key is input in the hundreds digit column so that the value is displayed at a step S621 while a process is effected at a step S622 for making the hundreds digit flag "0" as well as making the tens digit flag "1". Input of values to the tens digit and units digit columns is effected in a similar manner by operation of the ten keys 80–89.

FIGS. **21*a* and 21*b* show a flow chart showing a process of storing the magnification value input and displayed by the process of FIG. 19 in a memory location corresponding to a signal of the selection key 100–103** to be operated subsequently.

Figure 21A:
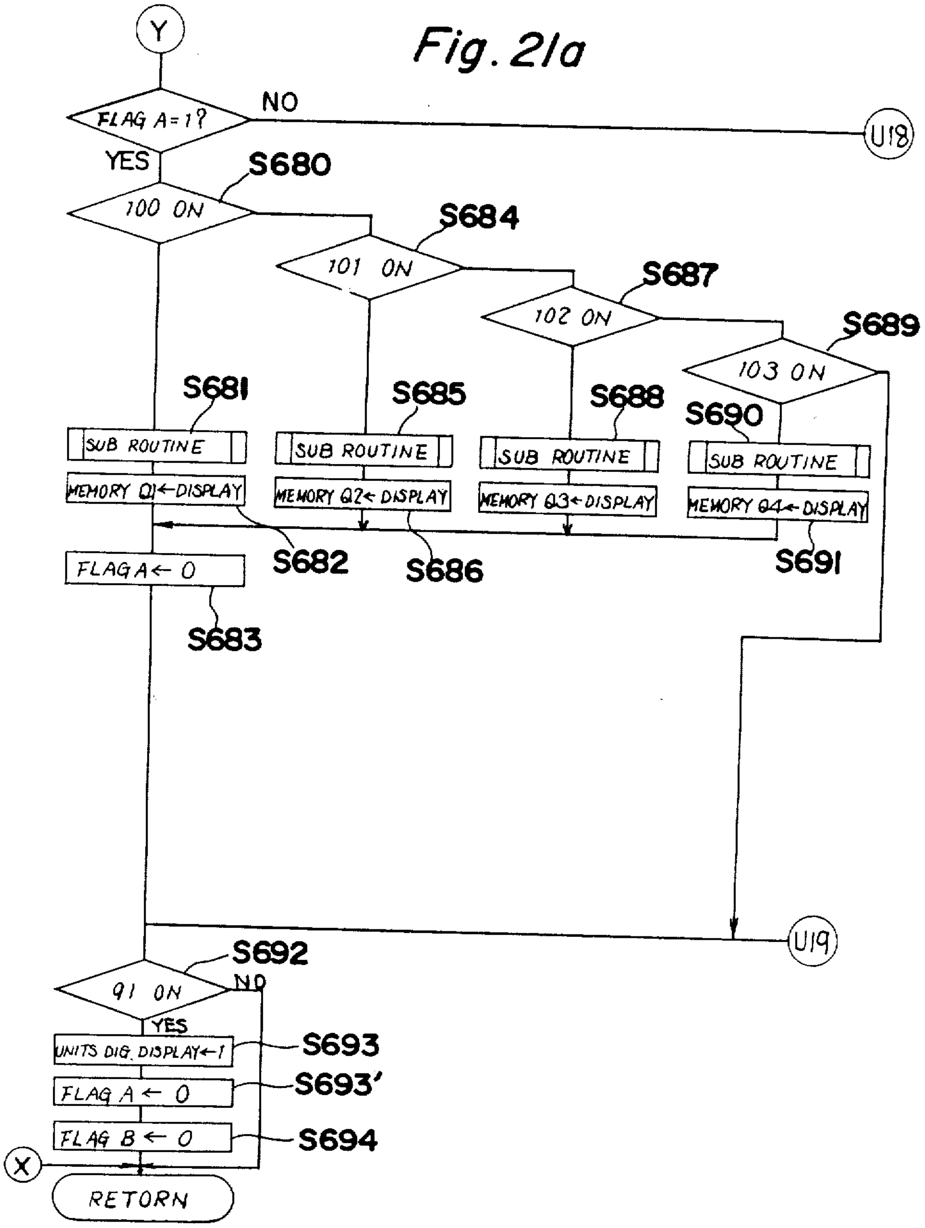
Figure 21B:
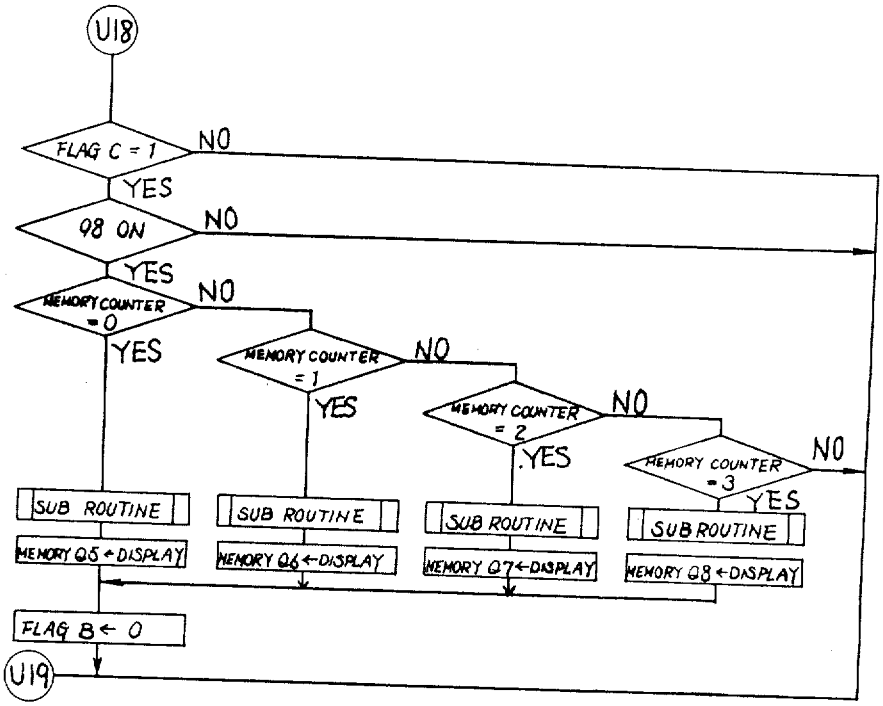

Upon input of the magnification data in the aforementioned manner, the process is advanced through a step Y in FIGS. **21*a* and 21*b* to a step S680 when the flag A is at "1", and the process is further advanced, if the selection key 100 is "on", through a subroutine S681 to a step S682, at which the input data is written in the memory location Q1. On the other hand, if the selection key 101 is "on", the process is advanced through a subroutine S685 to a step S686, at which the input magnification is written in the memory location Q2. Operations of other selection keys 102 and 103 are processed in a similar manner to the above. It is to be noted that FIGS. 21*a* and 21*b* are also illustrative of the writing process in the first magnification setting mode described with reference to FIG. 20**.

When the switch 98' is turned on, data is written in the memory locations Q5 through Q8 respectively in correspondence to the count set in the memory counter at that time.

In any magnification setting mode of the process shown in FIGS. **21*a* and 21*b*, there is basically performed storage of a displayed value in a memory corresponding to the operated selection key 95–98, 100–103. However, in such a stage, there might be displayed a value out of an allowable range of the copying magnification. Therefore, in the process of FIGS. 21*a* and 21*b***, sub routines indicated by steps S681, S685, S688 and S690 are carried out following a determination of operation of the respective keys, so that values out of said allowable range are not stored in the memories. The process of these sub routine steps is as shown in FIG. 12.

Figure 22A:
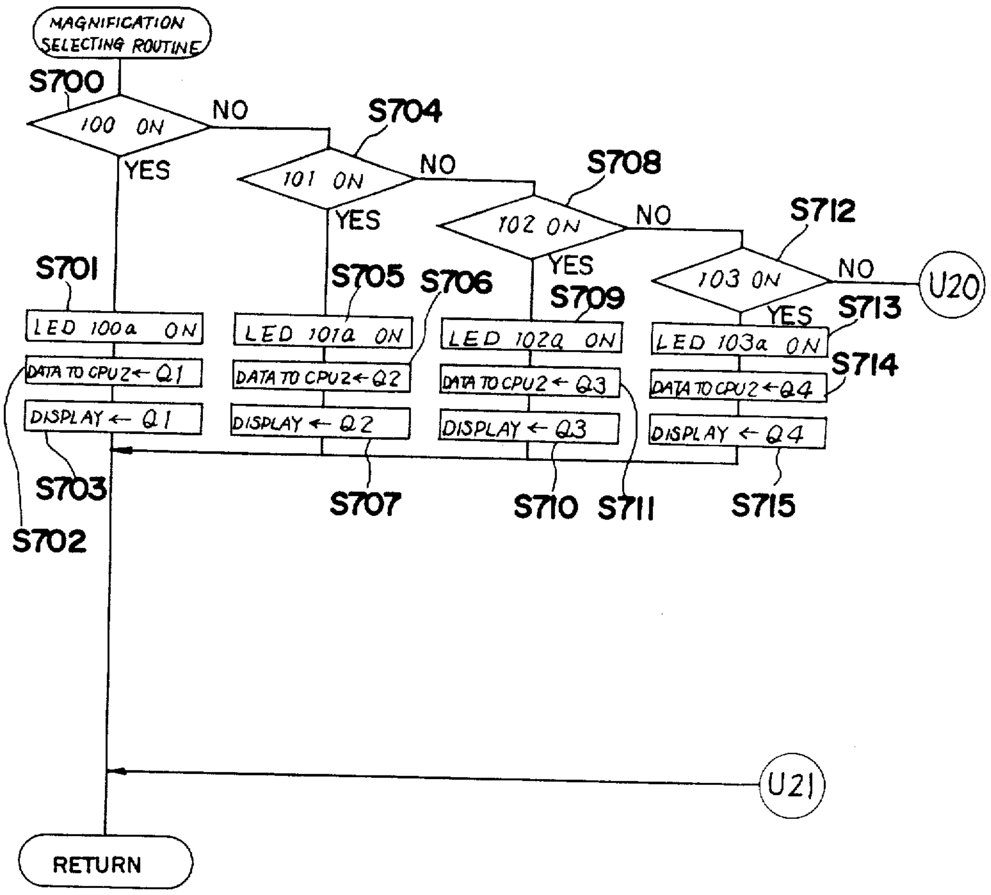
Figure 22B:
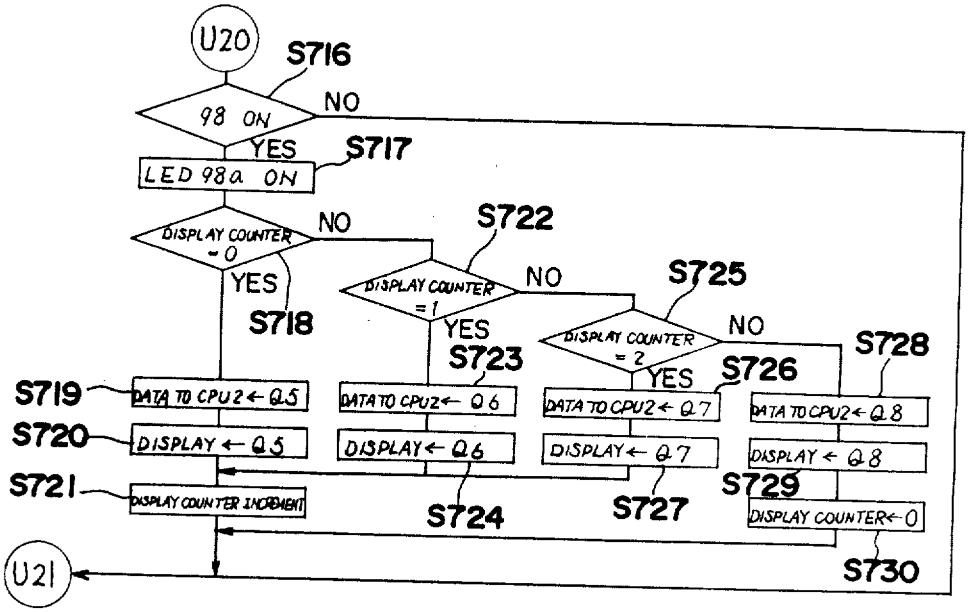

In FIGS. 22a and 22b, there is shown processes effected upon operation of a group of selection keys 100 through 103 and a selection 98' respectively.

When one of the keys 100 through 103 is operated, one of light emission diodes 100a through 103a (FIG. 18), corresponding to the operated key 100–103, is turned on, and if the value stored in the corresponding one of the memory locations Q1 through Q4 is not "0", said value is transferred as magnification data to the second CPU 202.

Once, on the other hand, the selection key 98' is turned on, the process is advanced from a step S266 to a step S717, at which a light emission diode 98'a is turned on while a determination is made at a step S718 as to whether or not a display counter is at "0", and if the determination is "Yes", the process is advanced to a step S719, at which the value in the memory location Q5 is transferred to the CPU 202 as well as displayed in the display device 72 at a step S720, and then the process is advanced to a step S721 at which the count at the display counter is increased by one.

When the selection key 98' is turned on again, the process is advanced from a step S722 to a step S723, at which the value in the memory location Q6 is transferred to the CPU 202. In such a way, the count at the display counter is increased by one every time, the selection key 98' is turned on to indicate the memory locations Q7 and Q8, thereafter returning to the memory location Q5.

Modification 2

The copying apparatus also has function of so-called interruption of copy, with which a copying operation in progress is interrupted to give priority to another kind of copying operation. Generally, when such an interruption copy mode is employed, storage is effected with respect to various data relating to the copying operation theretofore carried out including the copying magnification value, and the stored data is automatically reproduced upon releasing of the interruption copy mode. When a copying magnification setting device of the aforementioned type is used, however, though magnification data set before the interruption can be stored in switching to the interruption copy mode, the stored value is not reproduced, upon releasing of the interruption copy mode if the data stored in a part of the memory for storing the magnification is changed during the interruption copy mode, and thus the preset copying magnification is erased.

The second modification of the preferred embodiment contemplates overcoming the aforementioned disadvantage by modifying the process shown in FIGS. 8a and 8b. In this modification, the step S3' is followed by a determination (step S4') as to whether or not the copying apparatus is in the interruption copy mode, and if the determination is "Yes", the copying magnification cannot be updated.

Figure 24:
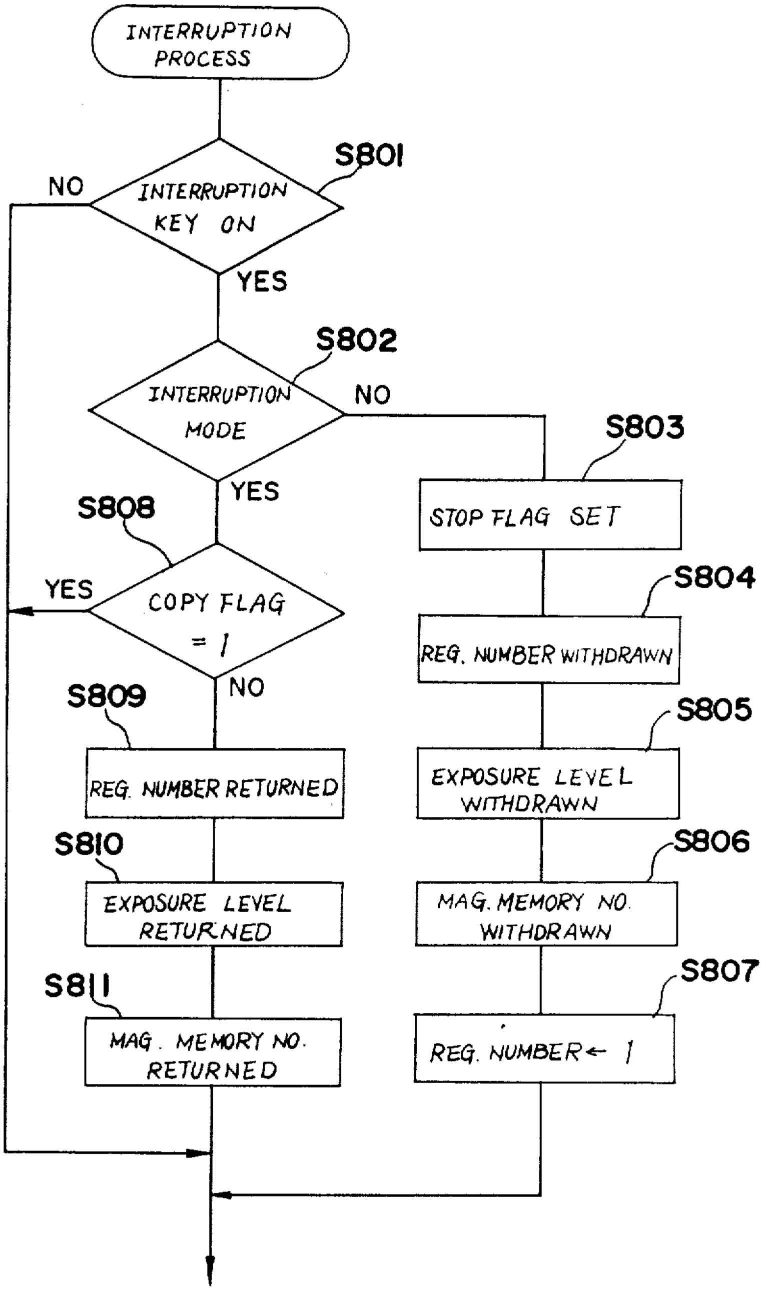

In FIG. 24, there is shown an example of the process for operating the interruption key 90.

When a determination is made at a step S801 that the interruption key 90 is turned on, a further determination is made at a step S802 as to whether the interruption key 90 is turned on in an interruption mode or in a normal mode, so that the process is advanced to a step S808 in the interruption mode while being advanced to a step S803 in the normal mode. At steps S803 through S807, there is effected the process in the interruption mode upon depression of the interruption key 90, in which a stop flag is set to interrupt the copying operation in progress while the number of copies already made and, the exposure level, i.e., the code indicating the level of the exposure level indicator 110 in FIG. 5 and the number of the selected key of the aforementioned magnification memory locations are respectively withdrawn into a memory, and a display "bbb1" (b indicates a blank) is made on the display device 72. At steps S808 through S811, there is effected the process upon releasing of the interruption mode, in which the aforementioned registered number of copies, the exposure level and the value of the magnification memory location respectively withdrawn in the said memory are reproduced as data for carrying out the copying operation in a predetermined memory provided that the copy flag is not "1". It is to be noted that the copy flag is set to be "1", e.g., from starting of paper feeding to completion of the scanning operation.

Figure 23A:
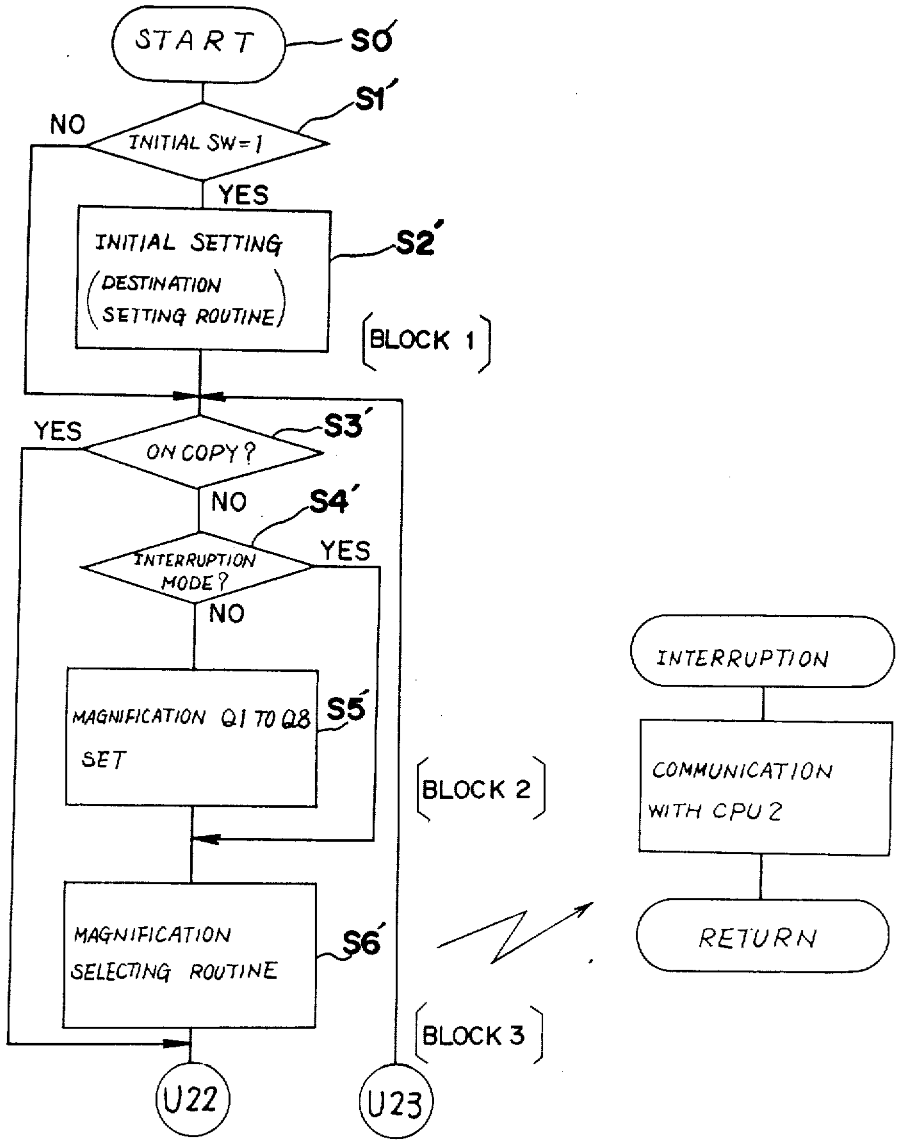
Figure 23B:
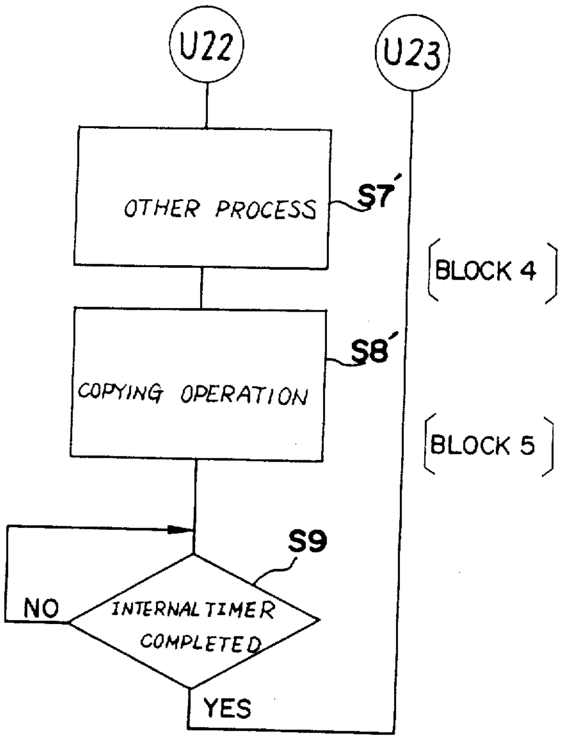

Therefore, if the interruption key 90 is depressed in the process of a copying operation in the normal mode, the copying apparatus is stopped upon completion of the operation in progress to be in a standby condition. In this condition, the set magnification value can be accessed by operation of the selection keys 95 through 98 or 100 through 103 while processes such as variation of said value are prohibited by the process at the step S4' in FIG. 23.

Modification 3

Figure 25:
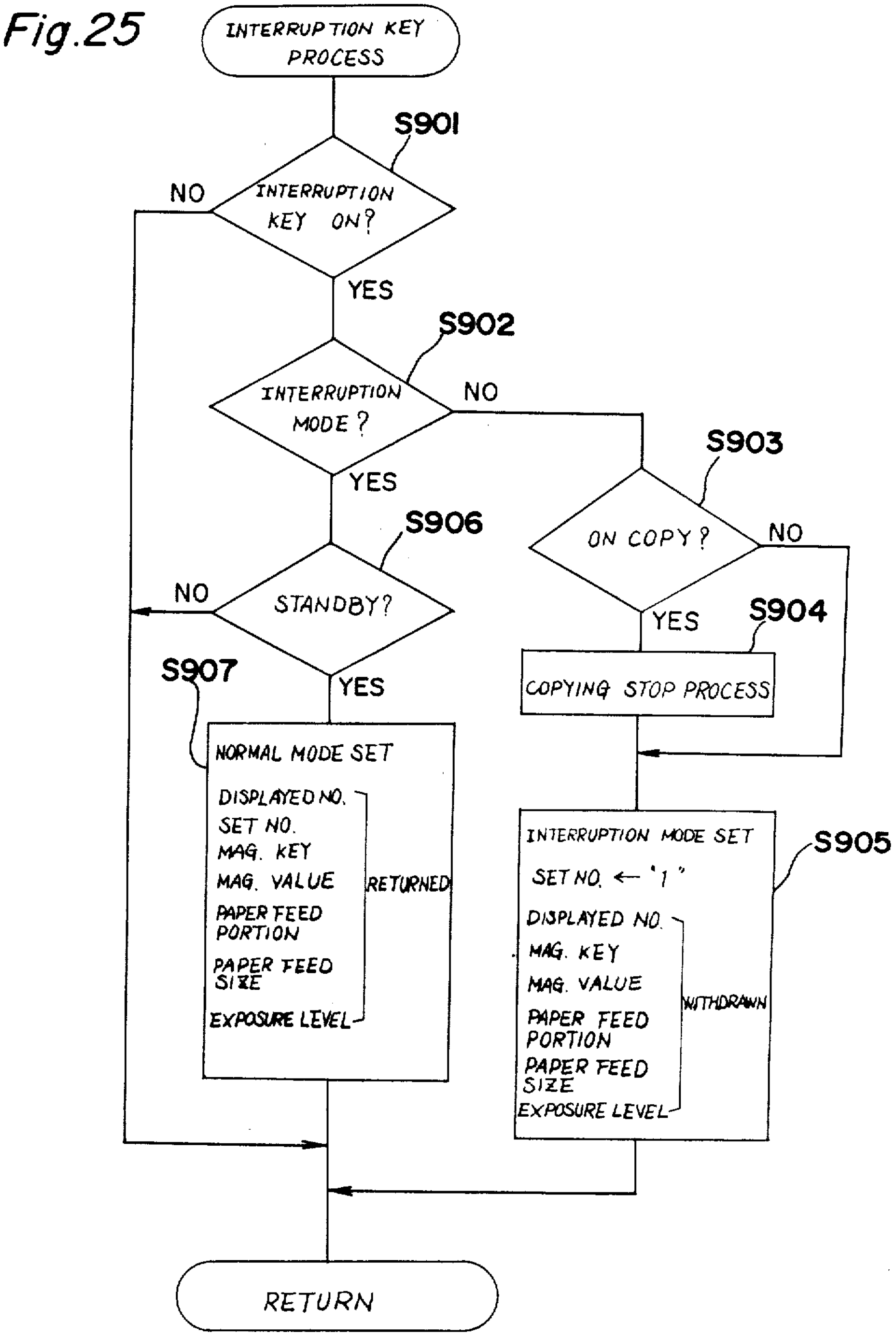

In FIG. 25, there is shown another modification of the flow chart of FIG. 24, which enables selected setting of the magnification in the interruption copy operation while maintaining the preset magnification value without modifying the flow chart of FIGS. 8a and 8b.

When a determination is made at the step S901 that the interruption key 90 is turned on, a further determination is made at the step S902 as to whether the interruption key 90 is turned on in an interruption mode or in a normal mode, so that the process is advanced to the step S906 in the interruption mode while being advanced to the step S903 in the normal mode. At the steps S903 through S905, there is effected the process in the interruption mode upon depression of the interruption key 90 in such a manner that a determination is made at the step S903 as to whether or not the copying apparatus is in the copying operation, and if the determination is "Yes", the copying operation is stopped at the step S904 while, at the step S905, a number displayed at the time of depression of the interruption key 90, i.e., the registered copy number, the paper feed portion, paper feed size exposure level, i.e., the code indicating the level of the exposure level indicator 110 in FIG. 5, the magnification value stored in the aforementioned magnfication memory location Q1 through Q8 and the selected magnification key are respectively withdrawn into other memory locations in CPU 201 and the interruption copy mode is established, thereby correcting the display in the display device 72 to "bbb1" (b indicates a blank).

At the steps S906 and S907, on the other hand, there is effected the process upon releasing of the interruption mode, in which the aforementioned registered copy number, the values of the exposure level and the magnification memory and the magnification key are returned as data for carrying out the copying operation to predetermined memory locations provided that the copying apparatus is in a standby condition.

Therefore, when the interruption key 90 is depressed in the progress of the copying operation in a normal mode, the copying apparatus is stopped upon completion of the copying operation, to be in a standby condition. In this condition, the set value of the copying magnification can be accessed by operation of the selection keys 95 through 98 or 100 through 103, or, varied by the ten keys for the interruption copying operation while said value is cancelled following releasing of the interruption mode, whereby the former value is established in each of the magnification memory locations.

According to the third modification as described above, the magnification value can be changed in the interruption mode with storage of the stored magnification value and/or the selected magnification key maintained so that the magnification value set before the interruption can be reproduced upon releasing of the interruption mode.

What is claimed is:

1. A device for setting a copying magnification in an electrophotographic copying apparatus, said device comprising:
- means for manually inputting a numerical value;
- a data storage means having a plurality of memory locations;
- selection key means for selecting one of said plurality of memory locations; and
- control means for storing a numerical value input by said numerical value input means in one of said memory locations selected by said selection key means, said control means setting an operation mode of said copying apparatus such that a numerical value stored in one of said memory locations selected by said selection key means corresponds to a copying magnification value.

2. The device as defined in claim 1, further including mode switching means for switching a control mode of said copying apparatus to a copying magnification setting mode wherein said means data storage means and said control means are so interconnected that said data storage means is capable of storing said numerical value input by said numerical value input means only in said copying magnification setting mode.

3. The device as defined in claim 1, wherein said data storage means comprises a first group of memory locations in which a numerical value corresponding to a predetermined copying magnification is stored in advance and a second group in which no numerical value is prestored.

4. The device as defined in claim 3, further including at least the preset means for presetting a predetermined value in said first group of memory means.

5. The device as defined in claim 4, wherein said preset means includes operation means for enabling variable combinations of values to be stored in said memory means.

6. The device as defined in claim 2, further including display means for displaying said value input by said numerical value input means, said display means being cleared upon switching to said copying magnification setting mode by said mode switching means to be in a standby condition for receiving an input from said numerical value input means.

7. The device as defined in claim 1, wherein said selection key means has a plurality of keys, each corresponding respectively to one of said plurality of memory locations.

8. The device as defined in claim 1, wherein said selection key means has at least one operation key, said operation key being operative to successively select each of a plurality of said plurality of said memory locations by operation of said operation key.

9. The device as defined in claim 1, wherein said numerical value input means further includes operation means for increasing or decreasing the input value by a predetermined number.

10. A device for setting a copying magnification in an electrophotographic copying apparatus, said device comprising:
- numerical value varying operation means for increasing or decreasing an input value by a predetermined number;
- memory means; and
- control means for storing a value set by said numerical value varying operation means in said memory means, said control means setting an operation mode of said copying apparatus such that said value corresponds to a copying magnification.

11. The device as defined in claim 10, wherein said numerical value varying operation means includes an UP key for increasing said input value by a predetermined number per one operation and a DOWN key for decreasing said value by a predetermined number per one operation.

13. The device as defined in claim 10, wherein said predetermined number is a value corresponding to a minimum value of a controllable copying magnification.

14. A device for setting a copying magnification in an electrophotographic copying apparatus, said device comprising:
- manually operable numerical value input means;
- memory means;
- memory operating means for storing a value input by said numerical value input means in said memory means;
- magnification setting means for reading said value stored in said memory means for setting an operation mode of said copying apparatus so that said read value corresponds to a copying magnification;
- an interruption copy mode setting means for interrupting a copying operation in progress for enabling starting of another copying operation; and
- control means for storing separate from said memory means, when said interruption copy mode setting means is operated to establish an interruption copy mode during a normal copying operation, the copying magnification set in advance of the establishment of said interruption copy mode, and for automatically reading said stored copying magnification upon the releasing of said interruption copy mode, for setting an operation mode of said copying apparatus.

15. The device as defined in claim 14, wherein said control means further functions in said interruption mode to substantially disable the ability to store a numerical value input in said memory means.

16. The device as defined in claim 14, wherein said memory means has a plurality of memory locations, said plurality of memory locations each being selectable by operation of a selection key means to be connected with said copying magnification setting means for storage of a magnification setting in said memory location.

17. The device as defined in claim 16, wherein said control means separately stores, during said interruption mode, values stored in said plurality of memory locations and a condition of operation of said selection means in existence at the time of the initiation of said interruption mode.

18. The device as defined in claim 17, wherein said selection key means includes a plurality of operation keys each respectively corresponding to one of said plurality of memory locations and said control means separately stores, during said interruption mode, inputs from keys operated prior to the time of the initiation of said interruption mode.

19. An apparatus for adjusting the magnification setting of a photocopying machine comprising:

a magnification/reduction apparatus contained as part of the photocopying machine;

a storage means for storing in respective memory locations a plurality of preselected data words indicative of a selected magnification/reduction ratio between the size of an image being copied and the size of the reproduced image;

a selection means for selecting a respective one of the memory locations;

a magnification control means for reading the data word stored in the respective selected memory location and for adjusting the magnification/reduction apparatus according to the value of the magnification/reduction ratio stored in the respective memory location.

20. The apparatus of claim 19, further comprising:

input means for modifying the magnification/reduction ratio in a selected one of at least a first plurality of the respective memory locations.

21. The apparatus of claim 20, further comprising:

means for modifying the magnification/reduction ratio from that which exists in a selected memory location, without changing the data word stored in that location; and means for inputting the so modified data word representing the so modified magnification/reduction ratio into the magnification control means.

22. The apparatus of claim 19 further comprising:

the magnification control means includes a microprocessor which provides an output signal to the magnification/reduction apparatus to control the magnification/reduction apparatus in accordance with data representative of a particular magnification/reduction ratio.

23. The apparatus of claim 20, further comprising:

the storage means containing a second plurality of memory locations in each of which is stored one of a plurality of typically-used magnification/reduction ratios intended to be relatively permanent and non-variable by the operator;

each of the second plurality of memory locations having associated therewith a selection key, the operation of which serves to load the contents of the respective one of the second plurality of memory locations into the magnification control means.

24. The apparatus of claim 23 further comprising:

an input control switch, means responsive to the operation of the input control switch for loading the contents into each of the second plurality of memory locations, including, alternatively, a table selection means for selecting the contents of stored tables of magnification/reduction values in response to a coded input, and a means responsive to input from the input means.

25. The apparatus of claim 19, further comprising:

an interruption means for interrupting one copying job in order to perform another copying job, interruption storage means responsive to the operation of the interruption means for storing the contents of at least the magnification/reduction values in the first plurality of memory locations, for reloading of such values into the respective one of the first plurality of memory locations upon completion of the operation of the interruption means.

26. The apparatus of claim 23, further comprising:

a plurality of selection keys, each associated with one of each of the first and second pluralities of memory locations, for selecting the contents of the respective memory locations for reading into the control means.

27. A magnifiication/reduction setting apparatus for use in a photocopying machine comprising:

a magnification/reduction apparatus contained as part of the photocopying machine, a data storage device having a first and a second plurality of memory locations, a first data input apparatus connected to the first plurality of memory locations and operatively connected to a magnifiication/reduction table storage apparatus in order to load into each of the first plurality of memory locations the data in a selected table representing preselected magnification/reduction values, a second data input apparatus including a plurality of selection keys, each associated with a respective one of the second plurality of memory locations and a numerical value selection apparatus having value selection keys and operative to select and display a magnification/reduction value to be loaded into the one of the plurality of memory locations associated with the respective selection key, a magnification control apparatus having a microprocessor controller responsive to the selected magnification/reduction value stored in a selected one of the first and second plurality of memory locations.

* * * * *